(12) United States Patent
Reddy et al.

(10) Patent No.: US 12,293,420 B2
(45) Date of Patent: May 6, 2025

(54) AUTONOMOUS ACCOUNTING ANOMALY DETECTION ENGINE

(71) Applicant: HIGHRADIUS CORPORATION, Houston, TX (US)

(72) Inventors: Nikil Kumar Reddy, Hyderabad (IN); Swami Subramanian, Houston, TX (US); Sudakshina Chaudhury, Bhubaneswar (IN); Rohit Roy Burman, Bhubaneswar (IN)

(73) Assignee: HighRadius Corporation, Houston, TX (US)

( * ) Notice: Subject to any disclaimer, the term of this patent is extended or adjusted under 35 U.S.C. 154(b) by 212 days.

(21) Appl. No.: 17/832,334

(22) Filed: Jun. 3, 2022

(65) Prior Publication Data

US 2023/0206348 A1    Jun. 29, 2023

Related U.S. Application Data

(60) Provisional application No. 63/294,267, filed on Dec. 28, 2021.

(51) Int. Cl.
*G06Q 40/12*    (2023.01)
*G06Q 20/40*    (2012.01)

(52) U.S. Cl.
CPC ....... *G06Q 40/128* (2013.12); *G06Q 20/4016* (2013.01); *G06Q 20/407* (2013.01); *G06Q 40/125* (2013.12)

(58) Field of Classification Search
CPC ............. G06Q 40/128; G06Q 20/4016; G06Q 20/407; G06Q 40/125; G06Q 20/389
See application file for complete search history.

(56) References Cited

U.S. PATENT DOCUMENTS

| 8,548,904 | B1* | 10/2013 | Bear | G06Q 30/0185 |
| | | | | 705/38 |
| 10,445,738 | B1* | 10/2019 | Waters | G06N 20/20 |

(Continued)

FOREIGN PATENT DOCUMENTS

CN    111931860 B    2/2021

OTHER PUBLICATIONS

Extended European Search Report for Application No. 22216230.7; dated Mar. 27, 2023; 9 pages.

*Primary Examiner* — A. Hunter Wilder
*Assistant Examiner* — Hunter Wilder
(74) *Attorney, Agent, or Firm* — Quarles & Brady LLP

(57) ABSTRACT

Novel tools and techniques are provided for detecting and correcting anomalous events in real-time in as users enter data into a general ledger. In various embodiments, a computing system may receive one or more user inputs. The computing system might analyze the one or more user inputs to determine whether there are one or more anomalous transactions associated with the one or more user inputs by obtaining historical information associated with the one or more user inputs and correlating, using one or more machine learning algorithms, the historical information and the one or more user inputs to detect one or more anomalies. Based on the correlation between the historical information and the one or more first user inputs, the computing system might detect at least one anomalous transaction and might generate one or more recommended actions to correct the at least one anomalous transaction.

19 Claims, 9 Drawing Sheets

(56) References Cited

U.S. PATENT DOCUMENTS

| | | | |
|---|---|---|---|
| 10,482,464 B1* | 11/2019 | Dietrich | G06Q 20/4016 |
| 11,868,957 B1* | 1/2024 | Bhure | G06Q 10/0633 |
| 2019/0377624 A1 | 12/2019 | Li et al. | |
| 2020/0104851 A1* | 4/2020 | Agarwal | G06N 3/084 |
| 2020/0286084 A1 | 9/2020 | Kwatra et al. | |
| 2020/0371832 A1* | 11/2020 | Baset | H04L 9/0643 |
| 2021/0073819 A1 | 3/2021 | Hernandez et al. | |

* cited by examiner

AUTONOMOUS ACCOUNTING ANOMALY DETECTION ENGINE

CROSS-REFERENCES TO RELATED APPLICATIONS

This application claims priority to U.S. Patent Application Ser. No. 63/294,267 (the "'267 Application"), filed Dec. 28, 2021, by HighRadius Corporation, entitled, "Anomaly Detection Artificial Intelligence Engine," the disclosure of which is incorporated herein by reference in its entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to detecting and correcting anomalous events in real-time in finance and accounting management processes and, more particularly, to methods, systems, and apparatuses for detecting and correcting anomalous events in real-time as users enter data into a general ledger.

BACKGROUND

Traditionally, as part of the month's financial closure process, financial analysts have to manually review financial transactions and statements and look at transactions within specific accounts to identify potential anomalies. This process is performed at the end of the month before the monthly financial closure to identify errors and also after the monthly financial closure to provide management commentary.

Thus, the review of the month's financial closure takes up an enormous amount of time and resources to find and to correct errors. Financial analysts spend a lot of time identifying and rectifying the entries. This causes a lot of work during the month end in addition to the regular financial period closing activities. Further, to ensure the accuracy of the financial statements, the financial analysts have to conduct a separate round of account reconciliations.

Thus, there is a need for development of systems and methods that are capable of flagging potential errors and anomalies in real-time for the financial analyst's immediate review and correction. Further, there is a need to significantly cut down the computing resources deployed and time spent by the finance team during the month end and to increase efficiency of the finance team. Hence, there is a need for more robust and scalable solutions for detecting and correcting anomalous events in real-time in finance and accounting management processes, and, more particularly, a need for more robust, autonomous and scalable solutions for detecting and correcting anomalous events in real-time as users enter data into a general ledger.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
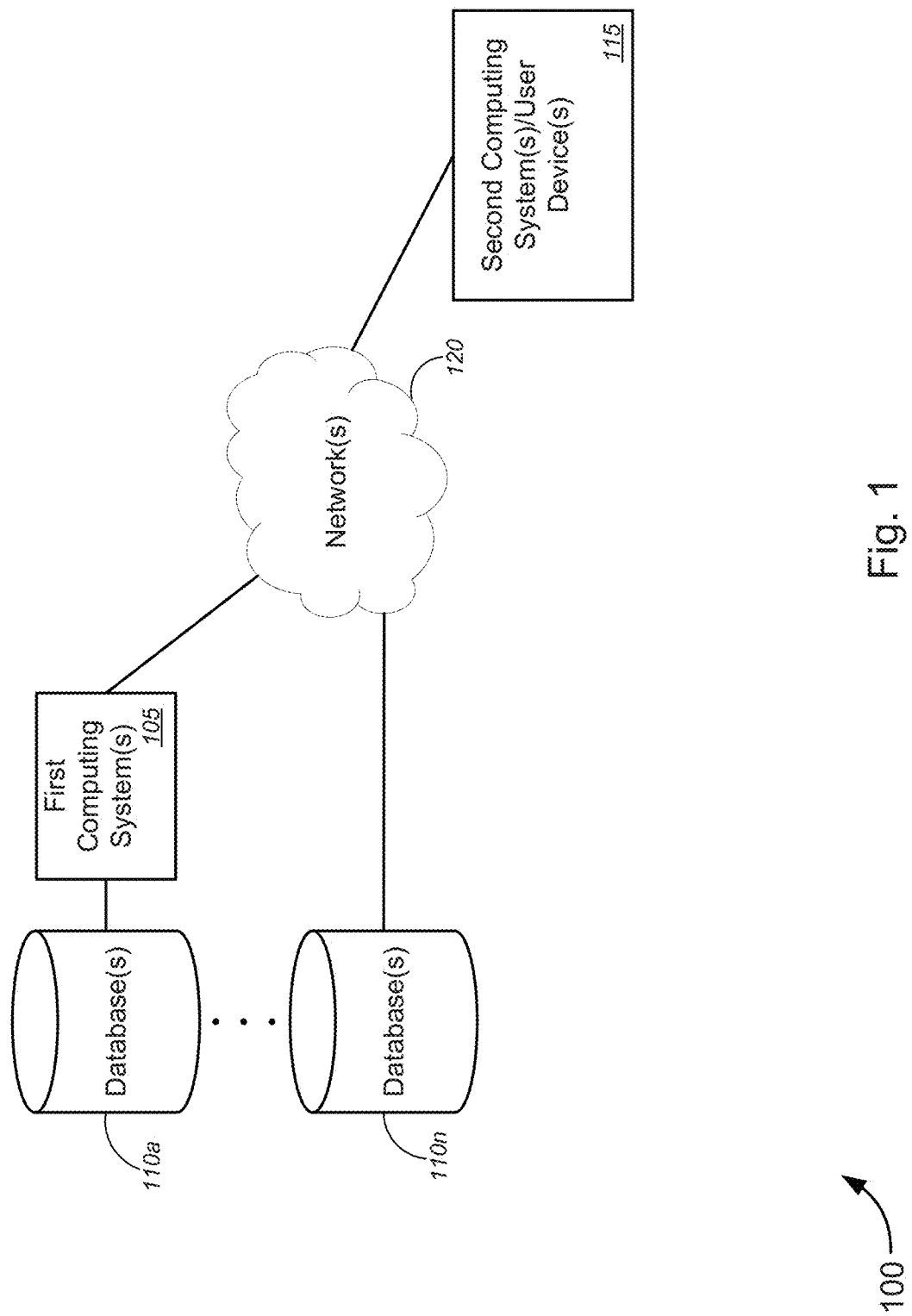
FIG. 1 is a schematic diagram illustrating a system for detecting and correcting anomalous events in real-time as users enter data into a general ledger, in accordance with various embodiments.

Various embodiments provide tools and techniques for detecting and correcting anomalous events in real-time in finance and accounting management processes and, more particularly, provide tools and techniques for implementing methods, systems, and apparatuses for detecting and correcting anomalous events in real-time as users enter data into a general ledger.

In various embodiments, one or more computing systems may receive one or more first user inputs into a general ledger stored on the one or more computing systems. The one or more computing systems might analyze the one or more first user inputs to detect one or more anomalous transactions associated with the one or more first user inputs. In order to analyze the one or more first user inputs to detect one or more anomalous transactions associated with the one or more first user inputs, the one or more computing systems might obtain historical information associated with one or more previous inputs and correlate, using one or more machine learning algorithms, the historical information and the one or more first user inputs to detect one or more anomalies associated with the one or more first user inputs. Next, based on the correlation between the historical information and the one or more first user inputs, the one or more computing systems might detect at least one anomalous transaction associated with the one or more first user inputs. Additionally, the one or more computing systems might generate one or more recommended actions to correct the at least one anomalous transaction.

According to some embodiments, analyzing the one or more first user inputs to detect the one or more anomalous transactions associated with the one or more first user inputs, detecting the at least one anomalous transaction associated with the one or more first user inputs, and generating one or more recommended actions to correct the at least one anomalous transaction occurs in real-time as the one or more first user inputs are received by the computing system and entered into the general ledger stored on the computing system. Alternatively, in some cases, analyzing the one or more first user inputs to detect one or more anomalous transactions associated with the one or more first user inputs, detecting the at least one anomalous transaction associated with the one or more first user inputs, and generating one or more recommended actions to correct the at least one anomalous transaction occurs at at least one of an end of a day, an end of a week, an end of a month, an end of a quarter, or an end of a year.

Several advantages may be realized by implementing the embodiments described herein. For example, by analyzing the one or more first user inputs to detect the one or more anomalous transactions associated with the one or more first user inputs, detecting the at least one anomalous transaction associated with the one or more first user inputs, and generating one or more recommended actions to correct the at least one anomalous transaction in real-time as the one or more first user inputs are received by the computing system, users entering data into a general ledger and/or the like can receive feedback in real-time regarding the data entries. The computing system can automatically detect errors or anomalous data in data entries in real-time as the user is entering the data. Further, the computing system can determine real-time recommended actions to correct the errors or anomalous data. Based on the determined real-time recommended actions to correct the errors or anomalous data, the computing system can automatically implement the determined real-time recommended actions and/or display the determined real-time recommended actions to a user to correct the errors and/or anomalous data. This is an improvement over prior art where errors or anomalous entries were detected and corrected at an end of the month or not detected and corrected at all. Instead, errors or anomalous entries can be detected and corrected in real-time as users are entering data into the general ledger. In summary, all embodiments described in this disclosure make detection and correction of anomalous entries more efficient and effective. These and other aspects of the tools and techniques for detecting anomalous events in real-time in finance and accounting management processes and, more particularly, for implementing methods, systems, and apparatuses for detecting anomalous events in real-time as users enter data into a general ledger are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, financial error detection technology, financial anomaly detection technology, data entry technology, machine learning technology, and/or the like. In other aspects, certain embodiments can improve the functioning of user equipment or systems themselves (e.g., financial error detection technology, financial anomaly detection technology, machine learning technology, etc.), for example, by, providing real-time feedback associated with one or more user inputs as the one or more user inputs are received by a computing system, by improving the speed and accuracy of the user equipment to in real-time automatically detect anomalies or errors when data is entered into a general ledger, and/or the like. For instance, the following steps may be performed in real-time as one or more first user inputs are received into a general ledger: analyzing, using the computing system, the one or more first user inputs to detect one or more anomalous transactions associated with the one or more first user inputs; obtaining, using the computing system, historical information associated with one or more previous inputs; correlating, using the computing system and one or more machine learning algorithms, the historical information and the one or more first user inputs to detect one or more anomalies associated with the one or more first user inputs; based on the correlation between the historical information and the one or more first user inputs, detecting, using the computing system, at least one anomalous transaction associated with the one or more first user inputs; and generating, using the computing system, one or more recommended actions to correct the at least one anomalous transaction; and/or the like. In this manner, the computing system can perform functions that the computing system could not previously perform. For instance, users of the computing system can receive real-time feedback regarding their entries into a general ledger and, in some cases, based on a detection of an anomaly users can correct their data entries in real-time without having to review the data at a later date or missing potential errors.

In additional aspects, certain embodiments can improve the functioning of user equipment or systems themselves (e.g., financial error detection technology, financial anomaly detection technology, machine learning technology, etc.), for example, by, improving the precision and accuracy of the systems by training the system in a specific business context, by automatically accepting or rejecting recommendations proposed by the system in real-time, or by training the system based on a user accepting or rejecting real-time recommendations proposed by the system. For example, the system can be trained for detecting anomalies specific to an organization, specific to an industry, specific to a region, specific to a time period, etc. Additionally, in a non-limiting example, the system can correct data entries automatically in real-time without having a user manually review the data or having a user miss potential errors. Alternatively, in a non-limiting example, if the user rejects or accepts a real-time recommendation of the system, the system will learn from the user selection and a subsequent risk score may be adjusted accordingly and/or similar recommendations may be automatically accepted or rejected in the future without user input. In this manner, the computing system can perform functions that the computing system could not previously perform. For instance, users of the computing system can receive real-time feedback regarding their entries into a general ledger, machine learning algorithms can be automatically implemented to correct errors in a general ledger, machine learning algorithms can be automatically trained or updated based on user selected recommendations, risks associated with recommendations can be automatically updated or recalculated, recommendations to correct anomalies may be automatically implemented, without user input, and/or the like.

In particular, to the extent any abstract concepts are present in the various embodiments, those concepts can be implemented as described herein by devices, software, systems, and methods that involve specific novel functionality (e.g., steps or operations), such as, providing real-time feedback associated with one or more user inputs as the one or more user inputs are received by a computing system. For instance, the following steps may be performed in real-time as one or more first user inputs are received int a general ledger: analyzing, using the computing system, the one or more first user inputs to detect one or more anomalous transactions associated with the one or more first user inputs; obtaining, using the computing system, historical information associated with one or more previous inputs; correlating, using the computing system and one or more machine learning algorithms, the historical information and the one or more first user inputs to detect one or more anomalies associated with the one or more first user inputs; based on the correlation between the historical information and the one or more first user inputs, detecting, using the computing system, at least one anomalous transaction associated with the one or more first user inputs; and generating, using the computing system, one or more recommended actions to correct the at least one anomalous transaction; and/or the like. These particular steps, to name a few examples, extend beyond mere conventional computer processing operations. These functionalities can produce tangible results outside of the implementing computer system, including, merely by way of example, real-time feedback and detection of errors and/or anomalous entries into a general ledger, real-time feedback and correction of errors and/or anomalous entries into a general ledger, automatic real-time correction of errors and/or anomalous entries into a general ledger, automatic training of machine learning algorithms based on specific business context, automatic training of machine learning algorithms based on user selected recommendations, improved accuracy, precision, and processing speed of computing systems using machine learning algorithms based on user selected recommendations, and/or the like, at least some of which may be observed or measured by users of the computing system, customers, and/or service providers.

In an aspect, a method may comprise, receiving, using a computing system, one or more first user inputs into a general ledger stored on the computing system. The method may continue by analyzing, using the computing system, the one or more first user inputs to detect one or more anomalous transactions associated with the one or more first user inputs. Analyzing the one or more first user inputs might include: obtaining, using the computing system, historical information associated with one or more previous inputs; and correlating, using the computing system and one or more machine learning algorithms, the historical information and the one or more first user inputs to detect one or more anomalies associated with the one or more first user inputs. Based on the correlation between the historical information and the one or more first user inputs, the method may additionally include detecting, using the computing system, at least one anomalous transaction associated with the one or more first user inputs. The method might further include generating, using the computing system, one or more recommended actions to correct the at least one anomalous transaction.

In some embodiments, analyzing the one or more first user inputs to detect the one or more anomalous transactions associated with the one or more first user inputs, detecting the at least one anomalous transaction associated with the one or more first user inputs, and generating one or more recommended actions to correct the at least one anomalous transaction occurs in real-time as the one or more first user inputs are received by the computing system and entered into the general ledger stored on the computing system. In various instances, analyzing the one or more first user inputs to detect one or more anomalous transactions associated with the one or more first user inputs, detecting the at least one anomalous transaction associated with the one or more first user inputs, and generating one or more recommended actions to correct the at least one anomalous transaction occurs automatically at at least one of an end of a day, an end of a week, an end of a month, an end of a quarter, or an end of a year.

Merely by way of example, in some cases, the historical information might include, without limitation, at least one of customer information, company information, or vendor information, and/or the like. The at least one of the customer information, the company information, or the vendor information may be associated with at least one of one or more previous user inputs into the general ledger, one or more third party inputs, or one or more customer inputs, one or more company inputs, or one or more vendor inputs, and/or the like. In some cases, the historical information may further include, without limitation, at least one of historical daily data, historical weekly data, historical monthly data, historical quarterly data, historical seasonal data, or historical yearly data, and/or the like. Additionally or alternatively, the historical information may include, without limitation, at least one of historical accounts receivable data, historical accounts payable data, or historical general ledger data, and/or the like.

In some instances, the one or more anomalous transactions might include, without limitation, a transaction amount outlier, a transaction type outlier, a missing transaction outlier, a transaction time outlier, a vendor transaction outlier, a customer transaction outlier, a department transaction outlier, a prepaid expense transaction outlier, an accrual transaction outlier, or a general ledger balance outlier, and/or the like.

In some embodiments, analyzing the one or more first user inputs to detect the one or more anomalous transactions associated with the one or more first user inputs might further include: obtaining, using the computing system, one or more transaction functions associated with the one or more first user inputs; and correlating, using the computing system and the one or more machine learning algorithms, the historical information, the one or more transaction functions, and the one or more first user inputs to detect the one or more anomalies associated with the one or more first user inputs. In some instances, the one or more transaction functions may be one or more customizable functions that a user of the computing system can add, edit, or delete.

In various cases, analyzing the one or more first user inputs to detect the one or more anomalous transactions associated with the one or more first user inputs might further include: obtaining, using the computing system, at least one of one or more growth predictions, one or more disruption predictions, or one or more seasonal predictions associated with the one or more first user inputs; and correlating, using the computing system and the one or more machine learning algorithms, the historical information, the one or more first user inputs, and at least one of the one or more growth predictions, the one or more disruption predictions, or the one or more seasonal predictions associated with the one or more first user inputs to detect the one or more anomalies associated with the one or more first user inputs.

Merely by way of example, in some instances, correlating, using the one or more machine learning algorithms, the historical information and the one or more first user inputs to detect the one or more anomalies associated with the one or more first user inputs might further include: determining, using the computing system and the one or more machine learning algorithms, an amount of deviation between the historical information and the one or more first user inputs; determining, using the computing system and the one or more machine learning algorithms, whether the amount of deviation between the historical information and the one or more first user inputs exceeds a predetermined threshold; and based on a determination that the amount of deviation between the historical information and the one or more first user inputs exceeds the predetermined threshold, detecting, using the computing system, the one or more anomalies associated with the one or more first user inputs.

In various embodiments, the method might further include: based on the generated one or more recommended actions to correct the at least one anomalous transaction, automatically prioritizing, using the computing system, the generated one or more recommended actions; and automatically executing, using the computing system, a highest priority recommended action to correct the at least one anomalous transaction. In some instances, a notification may be displayed to an end user of the computing system that the highest priority recommended action of the generated one or more recommended actions has been executed.

In some cases, the method might further include: based on the generated one or more recommended actions to correct the at least one anomalous transaction, automatically displaying, using the computing system, a prioritized list of recommended actions to an end user of the computing system; receiving, using the computing system, a selection of a user recommended action from the prioritized list of recommend actions from the user; and executing, using the computing system, the user recommended action. In some cases, the prioritized list of recommended actions may be displayed to the end user in real-time as the one or more first user inputs are received by the computing system and entered into the general ledger stored on the computing system. Additionally and/or alternatively, the one or more machine learning algorithms may be retrained based on the user recommended action.

In various instances, the method might further include: retraining, using the computing system, the one or more machine learning algorithms at least one of an end of a day based on daily data entered into the general ledger, an end of a week based on weekly data entered into the general ledger, an end of a month based on monthly data entered into the general ledger, an end of a quarter based on quarterly data entered into the general ledger, an end of a season based on seasonal data entered into the general ledger, or an end of a year based on yearly data entered into the general ledger.

In some embodiments, the method might further include: based on the correlation between the historical information and the one or more first user inputs, detecting, using the computing system, at least two anomalous transactions associated with the one or more first user inputs; calculating, using the computing system, a risk associated with each of the at least two anomalous transactions; prioritizing, using the computing system, the at least two of the anomalous transaction based on the risk associated with each of the at least two anomalous transactions; and at least one of automatically executing, using the computing system, the one or more recommended actions to correct a highest prioritized anomalous transaction or displaying, using the computing system, a list of prioritized anomalous transaction to an end user of the computing system.

In another aspect, a computing system might comprise at least one processor and a non-transitory computer readable medium communicatively coupled to the at least one processor. The non-transitory computer readable medium might have stored thereon computer software comprising a set of instructions that, when executed by the at least one processor, causes the computing system to: receive one or more first user inputs into a general ledger stored on the computing system; and analyze the one or more first user inputs to detect one or more anomalous transactions associated with the one or more first user inputs. Analyzing the one or more first user inputs might include obtaining historical information associated with one or more previous inputs; and correlating, using one or more machine learning algorithms, the historical information and the one or more first user inputs to detect one or more anomalies associated with the one or more first user inputs. The set of instructions, when executed by the at least one processor, might further cause the computing system to: based on the correlation between the historical information and the one or more first user inputs, detect at least one anomalous transaction associated with the one or more first user inputs; and generate one or more recommended actions to correct the at least one anomalous transaction.

In yet another aspect, a non-transitory computer readable medium might have stored thereon computer software comprising a first set of instructions that, when executed by a processor, causes a computing system to: receive one or more first user inputs into a general ledger stored on the computing system; and analyze the one or more first user inputs to detect one or more anomalous transactions associated with the one or more first user inputs. Analyzing the one or more first user inputs might include obtaining historical information associated with one or more previous inputs; and correlating, using one or more machine learning algorithms, the historical information and the one or more first user inputs to detect one or more anomalies associated with the one or more first user inputs. The set of instructions, when executed by the at least one processor, might further cause the computing system to: based on the correlation between the historical information and the one or more first user inputs, detect at least one anomalous transaction associated with the one or more first user inputs; and generate one or more recommended actions to correct the at least one anomalous transaction.

Various modifications and additions can be made to the embodiments discussed without departing from the scope of the invention. For example, while the embodiments described above refer to particular features, the scope of this invention also includes embodiments having different combinations of features and embodiments that do not include all of the above-described features.

Specific Exemplary Embodiments

We now turn to the embodiments as illustrated by the drawings. FIGS. 1-6 illustrate some of the features of the method, system, and apparatus for detecting and correcting anomalous events in real-time in finance and accounting management processes, and, more particularly, of methods, systems, and apparatuses for detecting and correcting anomalous events in real-time as users enter data into a general ledger, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for detecting anomalous events in real-time as users enter data into a general ledger ("GL"), in accordance with various embodiments. Although lines are used to denote communicative couplings and/or connections (e.g., wireless and/or wired connections) between devices, one or more intermediary devices (not shown) and/or networks (not shown) may be located between the one or more devices of FIG. 1.

In the non-limiting embodiment of FIG. 1, system 100 might comprise a first computing system(s) 105 and one or more corresponding database(s) 110a-110n (collectively, databases(s) 110) communicatively coupled to first computing system(s) 105. In some embodiments, system 100 might further include one or more second computing system(s) 115, one or more network(s) 120, and/or the like. Although the database(s) 110 and the one or more second computing systems 115 are shown to be external to the first computing system 105, the various embodiments are not so limited and the database(s) 110 and the one or more second computing systems 115 might be disposed within the first computing system 105. In some cases, the database(s) 110 and/or second computing system 115 may located within a same network or customer premises as the first computing system 105. Alternatively, the database(s) 110 and/or second computing system 115 may be remote from and/or located within a different network or customer premises than the first computing system 105.

In some embodiments, the first computing system 105 and/or the second computing system 115 might include, without limitation, a first processor (not shown) and a first memory (not shown). In some embodiments, the first computing system 105 and/or the second computing system 115 may include, without limitation, one or more of a user device, a server computer, a server computer over a network, a cloud-based computing system, a cloud-based computing system over a network, or a distributed computing system, and/or the like. In some cases, the first computing system 105 and/or the second computing system 115 may be, without limitation, at least one of a server computer, a desktop computer, a laptop computer, a tablet computer, a smart phone, a cellphone, a mobile phone, a personal digital assistant, or any suitable device capable of communicating via a web-based portal, an application programming interface ("API"), a server, a software application ("app"), or any other suitable communications interface, or the like.

System 100 might further comprise network(s) 120, which might communicatively couple at least one of the first computing system(s) 105, the database(s) 110, and/or the second computing system 115, and/or the like. The network (s) 120 might be service provider networks, content provider networks, local area networks, and/or the like. Network(s) might include, without limitation, one of a fiber network, an Ethernet network, a Token-Ring™ network, a wide-area network ("WAN"), a wireless wide area network ("WWAN"), a virtual private network ("VPN"), the Internet, an intranet, an extranet, a public switched telephone network ("PSTN"), an infra-red network, a wireless network operating under any of the IEEE 802.11 suite of protocols, the Bluetooth™ protocol known in the art, the Z-Wave protocol known in the art, the ZigBee protocol or other IEEE 802.15.4 suite of protocols known in the art, and/or any other wireless protocol, and/or any combination of these and/or other networks In operation, the first computing system(s) 105 and/or the second computing system(s) 115 might receive one or more first user inputs into a general ledger stored on the first computing system(s) 105, the one or more databases 110, the second computing system(s) 115, and/or the like. In some cases, instead of receiving the one or more first user inputs into a general ledger, the one or more first user inputs might be received in at least one of a balance sheet, an income statement, a cash flow statement, general ledger line items, accounts receivable statements, accounts payable statements, and/or the like. The one or more first user inputs might be one or more entries of data into the general ledger, one or more missing entries of data into the general ledger, and/or the like.

Next, the first computing system(s) 105 and/or the second computing system(s) 115 might analyze the one or more first user inputs to detect one or more anomalous transactions associated with the one or more first user inputs. The one or more anomalous transactions might include, without limitation, a transaction amount outlier, a transaction type outlier, a missing transaction outlier, a transaction time outlier, a vendor transaction outlier, a customer transaction outlier, a department transaction outlier, a prepaid expense transaction outlier, an accrual transaction outlier, or a general ledger balance outlier, and/or the like. These anomalous transactions are described in more detail with reference to FIGS. 2-4.

In order to analyze the one or more first user inputs to detect one or more anomalous transactions associated with the one or more first user inputs, the first computing system (s) 105 and/or the second computing system(s) 115 might obtain historical information associated with one or more previous inputs. The historical information associated with the one or more previous inputs might be stored in at least one of the first computing system(s) 105, the one or more databases 110, and/or the second computing system(s) 115. In some instances, the one or more databases 110 might be one or more company databases storing accounts receivable data, accounts payable data, balance sheet data, company transaction data, and/or the like, one or more third-party databases storing third party data (e.g., bank data, customer data, website interaction data, credit card data, debit card data, etc.), and/or one the like.

The historical information might include, without limitation, at least one of customer information, company information, or vendor information, and/or the like. The at least one of the customer information, the company information, or the vendor information may be associated with at least one of one or more previous user inputs into the general ledger, one or more third party inputs, or one or more customer inputs, one or more company inputs, or one or more vendor inputs, and/or the like. In some cases, the historical information may include, without limitation, at least one of historical daily data, historical weekly data, historical monthly data, historical quarterly data, historical seasonal data, or historical yearly data, and/or the like. Additionally or alternatively, the historical information may include, without limitation, at least one of historical accounts receivable data, historical accounts payable data, or historical general ledger data, and/or the like.

Additionally, in order to analyze the one or more first user inputs to detect one or more anomalous transactions associated with the one or more first user inputs, the first computing system(s) 105 and/or the second computing system(s) 115 might correlate the historical information and the one or more first user inputs to detect one or more anomalies associated with the one or more first user inputs. This correlation step might be performed using one or more machine learning algorithms that are trained based on the historical information to detect one or more anomalous transactions in the one or more first user inputs. This analysis step may occur in real-time as the one or more first user inputs are received by the first computing system(s) 105 and/or the second computing system(s) 115 and entered into the general ledger stored on the first computing system(s) 105, the one or more databases 110, and/or the second computing system(s) 115. In this manner, users can receive real-time feedback associated with the one or more first user inputs and determine whether the one or more first user inputs are associated with at least one anomalous transaction.

In some embodiments, based on the correlation between the historical information and the one or more first user inputs, the first computing system(s) 105 and/or the second computing system(s) 115 might detect at least one anomalous transaction associated with the one or more first user inputs. This detection step may occur in real-time as the one or more first user inputs are received by the first computing system(s) 105 and/or the second computing system(s) 115 and entered into the general ledger stored on the first computing system(s) 105, the one or more databases 110, and/or the second computing system(s) 115. In this manner, users can receive real-time feedback associated with the one or more first user inputs and detect in real-time when the one or more first user inputs are associated with at least one anomalous transaction.

In various instances, the first computing system(s) 105 and/or the second computing system(s) 115 might generate one or more recommended actions to correct the at least one anomalous transaction associated with the one or more user inputs. In some cases, this generation step might also use one or more machine learning algorithms to determine and generate the best way to correct the at least one anomalous transaction. This generation step may also occur in real-time as the one or more first user inputs are received by the first computing system(s) 105 and/or the second computing system(s) 115 and entered into the general ledger stored on the first computing system(s) 105, the one or more databases 110, and/or the second computing system(s) 115. In this manner, the first computing system(s) 105 and/or the second computing system(s) 115 can automatically correct the at least one anomalous transaction in real-time and/or users can receive real-time recommendations associated with the one or more first user inputs to correct the at least one anomalous transaction.

In some instances, the first computing system(s) 105 and/or the second computing system(s) 115 might automatically implement the one or more recommended actions to correct the at least one anomalous transaction associated with the one or more user inputs. Alternatively, the first computing system(s) 105 and/or the second computing system(s) 115 might automatically display the one or more recommended actions to a user of the first computing system(s) 105 and/or the second computing system(s) 115 and receive a selection from a user to correct the at least one anomalous transaction. This implementation and/or display step may occur in real-time as the one or more first user inputs are received by the first computing system(s) 105 and/or the second computing system(s) 115 and entered into the general ledger stored on the first computing system(s) 105, the one or more databases 110, and/or the second computing system(s) 115. In this manner, the first computing system(s) 105, the second computing system(s) 115, and/or users of the first computing system(s) 105 and/or the second computing system(s) 115 can correct the at least one anomalous transaction in real-time instead of correcting the at least one anomalous transaction at an end of a month.

These and other functions of the system 100 (and its components) are described in greater detail below with respect to FIGS. 2-6.

Figure 2:
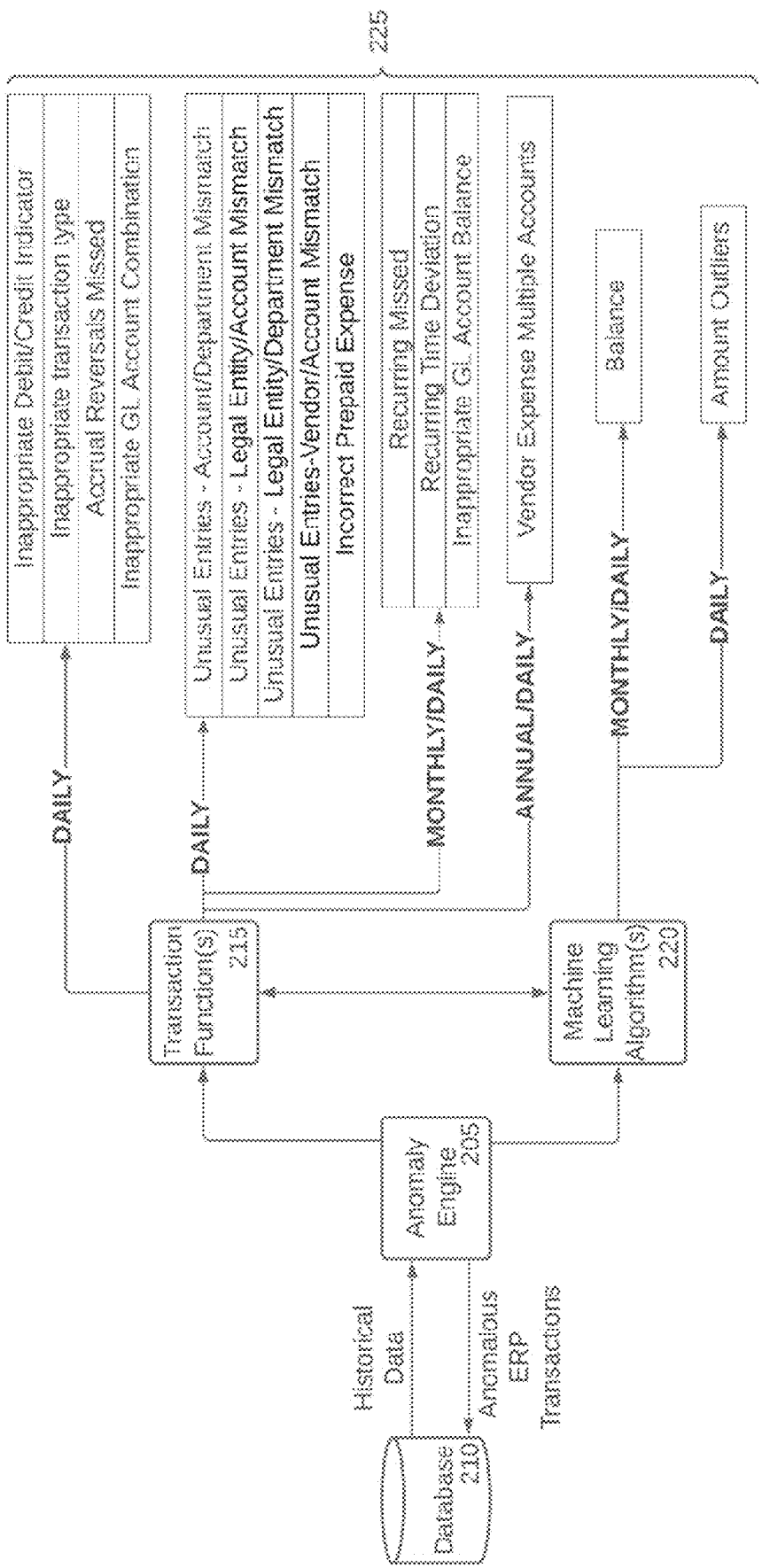
FIG. 2 is a workflow diagram illustrating a system for detecting anomalous events in real-time as users enter data into a general ledger, in accordance with various embodiments.

FIG. 2 is a workflow diagram illustrating a system 200 for detecting anomalous events in real-time as users enter data into a general ledger ("GL"), in accordance with various embodiments. FIG. 2 is intended to provide an illustrative perspective with respect to the detection of anomalous events in real-time as users enter data into a general ledger ("GL"), and is not limited to such functionalities, but may be applicable to some (if not all) of the functionalities described above with respect to FIG. 1 or below with respect to FIGS. 3-6.

As shown in FIG. 2, there may be an anomaly engine or an anomaly detection engine 205 which may be a computer program implemented on the computing system(s) 105 and/or 115 of FIG. 1. The anomaly engine 205 may receive one or more first user inputs from a computing system (e.g., computing system(s) 105 and/or 115 of FIG. 1) into a general ledger.

In some cases, the anomaly engine 205 may optionally analyze the one or more first user inputs to determine historical data to retrieve from database 210 (which may correspond to database(s) 110 of FIG. 1). Based on the one or more first user inputs, the anomaly engine 205 may optionally retrieve historical data associated with the one or more user inputs from databases 210.

The database 210 may contain at least one of customer information, company information, or vendor information, and/or the like. The at least one of the customer information, the company information, or the vendor information may be associated with at least one of one or more previous user inputs into the general ledger, one or more third party inputs (e.g., from banks, from enterprise resource planning systems, from third party applications, etc.), or one or more customer inputs, one or more company inputs, or one or more vendor inputs, and/or the like. In some cases, the historical information may include, without limitation, at least one of historical daily data, historical weekly data, historical monthly data, historical quarterly data, historical seasonal data, or historical yearly data, and/or the like. Additionally or alternatively, the historical information may include, without limitation, at least one of historical accounts receivable data, historical accounts payable data, or historical general ledger data, and/or the like. In some cases, database 210 may ingest new historical information at scheduled intervals (e.g., at an end of a day, at an end of a week, and/or the like). Database 210 may contain historical information from multiple different sources and may normalize and standardize the historical information received from the multiple different sources.

Next, the anomaly engine 205 may use one or more transaction functions 215 to analyze the one or more first user inputs to determine one or more anomalies 225 associated with the one or more user inputs. In some cases, the anomaly engine 205 may not use the historical information when analyzing the one or more first user inputs against the one or more transaction functions 215 to determine one or more anomalies 225 associated with the one or more user inputs. Alternatively, in other cases, the anomaly engine 205 may correlate the historical data with the one or more first user inputs and the one or more transaction functions 215 to determine one or more anomalies 225 associated with the one or more user inputs.

The one or more transaction functions 215 may be customized by a user of the anomaly engine 205. A user may define, view, edit, and/or delete the one or more transaction functions 215. In some instances, the user can define at least one of the type of anomaly, a risk associated with each type of anomaly, a time to look for each anomaly, and/or the like.

Additionally and/or alternatively, the anomaly engine 205 may use one or more machine learning algorithms 220 to analyze the one or more first user inputs to determine one or more anomalies 225 associated with the one or more user inputs. The anomaly engine 205, using the one or more machine learning algorithms, may correlate the one or more first user inputs with the historical information to determine one or more anomalies 225 associated with the one or more user inputs. In some instances, the one or more machine learning algorithms 220 may be used to develop one or more transaction functions 215. In a non-limiting example, if the anomaly engine 205, using machine learning algorithms 220, detects a particular customer is associated with a particular type of transaction (e.g., a customer always pays with credit and does not pay with debit), then the anomaly engine 205, using the machine learning algorithms 220, might develop a transaction function associated with the particular customer to detect an anomaly if the customer pays with a different type of transaction.

In some cases, the anomaly engine 205 might use both the one or more transaction functions 215 and one or more machine learning algorithms 220 to analyze the one or more first user inputs to determine one or more anomalies 225 associated with the one or more user inputs. For example, the anomaly engine 205, using the one or more machine learning algorithms 220, may correlate the one or more first user inputs with the historical information and the one or more transaction functions 215 to determine one or more anomalies 225 associated with the one or more user inputs.

In operation, the anomaly engine 205 may compare the one or more first user inputs against the one or more transaction functions 215 to determine whether at least one anomalous transaction is associated with the one or more user inputs. Alternatively, the anomaly engine 205 may correlate the one or more first user inputs with the historical information using the machine learning algorithm to determine whether at least one anomalous transaction is associated with the one or more user inputs. Alternatively, the anomaly engine 205 may correlate the one or more transaction functions, the one or more first user inputs, and the historical information using the machine learning algorithm to determine whether at least one anomalous transaction is associated with the one or more user inputs.

The one or more transaction functions 215 and/or machine learning algorithm may be used to detect one or more anomalies 225. Although some of the anomalies 225 are associated with the one or more transaction functions 215 and others are associated with the machine learning algorithms, the anomalies 225 associated with the one or more transaction functions 215 may also be detected by using the one or more machine learning algorithms and/or the anomalies 225 associated with the one or more machine learning algorithms 220 may also be detected by using the one or more transaction functions 215. The one or more anomalies 225 might include, without limitation:

a. Inappropriate Debit/Credit Indicator: The anomaly engine 205 will detect and flag, using the transaction functions 215 and/or machine learning algorithms 220, a transaction where the debit/credit indicator is not expected for the transaction type in the general ledger;

b. Inappropriate Transaction Type: The anomaly engine 205 will check whether any transaction is present other than a list of expected transaction types and will detect and flag, using the transaction functions 215 and/or machine learning algorithms 220, a transaction as unexpected if it is not in the list of expected transactions;

c. Inappropriate General Ledger Account Balance: The anomaly engine 205, using the transaction functions 215 and/or machine learning algorithms 220, raises an alert for the general ledger if a day end, a week end, a month end, etc. balance is not found to be as expected;

d. Inappropriate General Ledger Account Combination: The anomaly engine 205 detects and flags, using the transaction functions 215 and/or machine learning algorithms 220, the transaction if the posting does not happen between an expected pair of general ledger accounts for the given transaction type;

e. Vendor Expense Multiple Accounts: The anomaly engine 205 detects and flags, using the transaction functions 215 and/or machine learning algorithms 220, vendor transactions where the amount is being posted to multiple Expense accounts;

f. Unusual Entries-Account/Department Mismatch: For a given general ledger account, the transactions which are raised from new departments are detected and flagged, using the transaction functions 215 and/or machine learning algorithms 220, by the anomaly engine 205;

g. Unusual Entries-Legal Entity/Account Mismatch: In a given legal entity, the transactions which are raised from new general ledger accounts are detected and flagged, using the transaction functions 215 and/or machine learning algorithms 220, by the anomaly engine 205;

h. Unusual Entries-Legal Entity/Department Mismatch: In a given legal entity, the transactions which are raised from new departments are detected and flagged, using the transaction functions 215 and/or machine learning algorithms 220, by the anomaly engine 205;

i. Unusual Entries-Vendor/Account Mismatch: For a given vendor, the transactions which are raised to new expense accounts are detected and flagged, using the transaction functions 215 and/or machine learning algorithms 220, by the anomaly engine 205;

j. Incorrect Prepaid Expense: Unusually high dollar vendor transactions posted in expense accounts are detected and flagged, using the transaction functions 215 and/or machine learning algorithms 220, by the anomaly engine 205;

k. Recurring Missed: The anomaly engine 205 detects and flags, using the transaction functions 215 and/or machine learning algorithms 220, transactions that did not occur in the current month, quarter, etc.;

l. Accrual Reversals Missed: The anomaly engine 205 detects and flags, using the transaction functions 215 and/or machine learning algorithms 220, accrual transactions which have not been reversed;

m. Recurring Time Deviations: The anomaly engine 205 detects and flags, using the transaction functions 215 and/or machine learning algorithms 220, recurring transactions that were not posted in the expected time range;

n. Day, Week, Month, Quarter, Year, etc. End Balance Outlier: The anomaly engine 205 detects and flags, using the transaction functions 215 and/or machine learning algorithms 220, deviations between a forecasted balance of the general ledger account and an actual balance of the general ledger account; and o. Amount Outlier: The anomaly engine 205 detects and flags, using the transaction functions 215 and/or machine learning algorithms 220, transactions with unusually high or low amounts for the given general ledger account and/or the transaction type; and/or the like.

If the anomaly engine 205 detects one or more anomalous transactions associated with the one or more user inputs, the anomaly engine 205 might generate one or more recommended actions to correct the one or more anomalous transactions.

Alternatively, or additionally, one or more other methods for detecting anomalous and correcting anomalous events in real-time as users enter data into a general ledger, are described in greater detail below with respect to FIGS. 3-6.

FIGS. 3A-3D (collectively, FIG. 3) are flow diagrams illustrating a method 300 for detecting anomalous events in real-time as users enter data into a general ledger ("GL"), in accordance with various embodiments. While the techniques and procedures are depicted and/or described in a certain order for purposes of illustration, it should be appreciated that certain procedures may be reordered and/or omitted within the scope of various embodiments. Moreover, while the method 300 illustrated by FIG. 3 can be implemented by or with (and, in some cases, are described below with respect to) the systems, examples, or embodiments 100 and 200 of FIGS. 1 and 2, respectively (or components thereof), such methods may also be implemented using any suitable hardware (or software) implementation. Similarly, while each of the systems, examples, or embodiments 100 and 200 of FIGS. 1 and 2, respectively (or components thereof), can operate according to the method 300 illustrated by FIG. 3 (e.g., by executing instructions embodied on a computer readable medium), the systems, examples, or embodiments 100 and 200 of FIGS. 1 and 2 can each also operate according to other modes of operation and/or perform other suitable procedures.

In the non-limiting embodiment of FIG. 3, method 300, may comprise, at block 302, receiving, using computing system, one or more first user inputs into a general ledger stored on the computing system. The one or more user inputs may be one or more entries into a general ledger, one or more missing entries in a general ledger, and/or the like.

In some embodiments, the computing system might include, without limitation, a first processor and a first memory. In some embodiments, the computing system may include, without limitation, one of a user device, a server computer, a server computer over a network, a cloud-based computing system, a cloud-based computing system over a network, or a distributed computing system, and/or the like.

At block 304, method 300 may analyze, using the computing system, the one or more first user inputs to detect one or more anomalous transactions associated with the one or more first user inputs. The one or more first user inputs may be analyzed in real-time as a user enters the one or more first user inputs into the general ledger. In some cases, the method 300, at optional block 306, may analyze, using the computing system, the one or more first user inputs using one or more transaction functions. The one or more transaction functions might include one or more customizable functions that a user of the computing system can add, edit, or delete.

In a non-limiting example, the one or more transaction functions might include, without limitation, one or more functions associated with a customer (e.g., a transaction limit associated with a customer, a pattern of payments associated with a customer, a missing payment associated with a customer, and/or the like), customer type (e.g., a transaction limit associated with a type of customer, a transaction limit associated with a new customer, multiple entries of a same customer transaction, a recurring customer transaction, and/or the like), a company, a company type, a vendor (e.g., a particular transaction limit associated with a vendor, a pattern of expenses associated with a particular vendor, a missing expense associated with a vendor, multiple entries of a same vendor transaction, a recurring vendor expense, and/or the like), or a vendor type (e.g., a particular transaction limit associated with a type of vendor, a particular transaction limit associated with a new vendor, and/or the like), one or more functions associated with a transaction type, a transaction amount, an unexpected transaction, or a recurring transaction, one or more functions associated with a general ledger balance (e.g., a limit on the balance, etc.), one or more functions associated with a department (e.g., a transaction limit for new departments, a transaction limit for an over budget department, etc.) or a user (e.g., a transaction limit for new employees, a transaction limit for over budgets user, etc.) of the general ledger, one or more functions associated with a general ledger account (e.g., a general ledger account balance, an unexpected transaction in a general ledger, a recurring transaction in a general ledger account, a new general ledger account, etc.), a general ledger account ID, or a new expense account, one or more functions associated with accruals, one or more functions associated with defining a risk associated with each user entry or transaction function, and/or the like.

In some instances, the one or more transaction functions may be created or developed using one or more machine learning algorithms (described in optional blocks 308-316) detecting one or more trends in historical data.

Additionally and/or alternatively, the method 300, at optional block 308, may analyze, using the computing system, the one or more first user inputs using one or more machine learning algorithms. In order to analyze the one or more first user inputs using the one or more machine learning algorithms, the method 300 might continue onto optional block 310 in FIG. 3B. In optional block 310, the method 300 might obtain, using the computing system, historical information associated with one or more previous inputs. In some cases, the one or more previous inputs may be associated with or related to the one or more attributes of the one or more first user inputs. In a non-limiting example, if the one or more first user inputs are associated with a particular customer, then the one or more previous user inputs may be associated with the particular customer. The one or more attributes associated with the request and/or one or more user inputs might include, without limitation, a customer, a type of customer, a company, a type of company, a vendor, a type of vendor, a type of industry, a location of the company, a location of a customer, a location of a vendor, a department, a type of transaction (e.g., a customer transaction, a company transaction, a vendor transaction, a credit, a debit, a payment, an accrual, and/or the like), an amount of a transaction, a date of a transaction, a source of a transaction, an account type, and/or the like.

The machine learning algorithms, to effectively detect one or more anomalies, may need a source of data that assists in establishing patterns from which these detections may be derived. The data sources may be any combination of data stored historically or may be provided as a source directly while data is collected and stored in real-time. Data may be any combination of structured, unstructured, or semi-structured data that may constitute recorded data, written data, digital audio data, digital video data, or any other type of data relevant for any given machine learning algorithm. A machine learning algorithm may use more than one source of data to analyze the one or more user inputs. The example sources of data mentioned in this disclosure are not intended to limit the types of data sources that may be used. It is generally understood that the variety and use of data sources as inputs to machine learning and data mining techniques is virtually unlimited.

The historical information might include, without limitation, at least one of customer information, company information, or vendor information, and/or the like. The at least one of the customer information, the company information, or the vendor information may be associated with at least one of one or more previous user inputs into the general ledger, one or more third party inputs, or one or more customer inputs, one or more company inputs, or one or more vendor inputs, and/or the like. In some cases, the historical information may further include, without limitation, at least one of historical daily data, historical weekly data, historical monthly data, historical quarterly data, historical seasonal data, or historical yearly data, and/or the like. Additionally or alternatively, the historical information may include, without limitation, at least one of historical accounts receivable data, historical accounts payable data, or historical general ledger data, and/or the like.

In some cases, the method 300 might further obtain, at optional block 312, one or more transaction functions associated with the one or more first user inputs. The one or more transaction functions might be the one or more transaction functions described with respect to optional block 306 of the method 300. In various instances, the method 300, at optional block 314, might also obtain at least one of one or more growth predictions, one or more disruption predictions, or one or more seasonal predictions associated with the one or more first user inputs.

In some cases, the historical information, the one or more transaction functions, and/or the at least one of the one or more growth predictions, the one or more disruption predictions, or the one or more seasonal predictions may be associated with different weights to determine whether an anomaly exists. In a non-limiting example, historical trends may be given more weight than the one or more transaction functions when determining whether the one or more first user inputs are associated with an anomalous transaction.

Once at least one of the historical information, the one or more transactions functions, the one or more growth predictions, the one or more disruption predictions, or the one or more seasonal predictions are obtained, method 300, at optional block 316, might correlate, using the computing system and the one or more machine learning algorithms, the historical information with the one or more first user inputs to detect one or more anomalies associated with the one or more first user inputs. In various instances, the method 300, at optional block 316, might include correlating the historical information and, optionally, the one or more transactions functions, the one or more growth predictions, the one or more disruption predictions, or the one or more seasonal predictions with the one or more first user inputs to detect one or more anomalies associated with the one or more first user inputs.

In some cases, as the user is entering the one or more first user inputs, the computing system might automatically develop in real-time one or more machine learning algorithms using historical data associated with attributes of the one or more user inputs. Alternatively, the one or more machine learning algorithms may already exist before the one or more user inputs are entered.

Figure 3A:
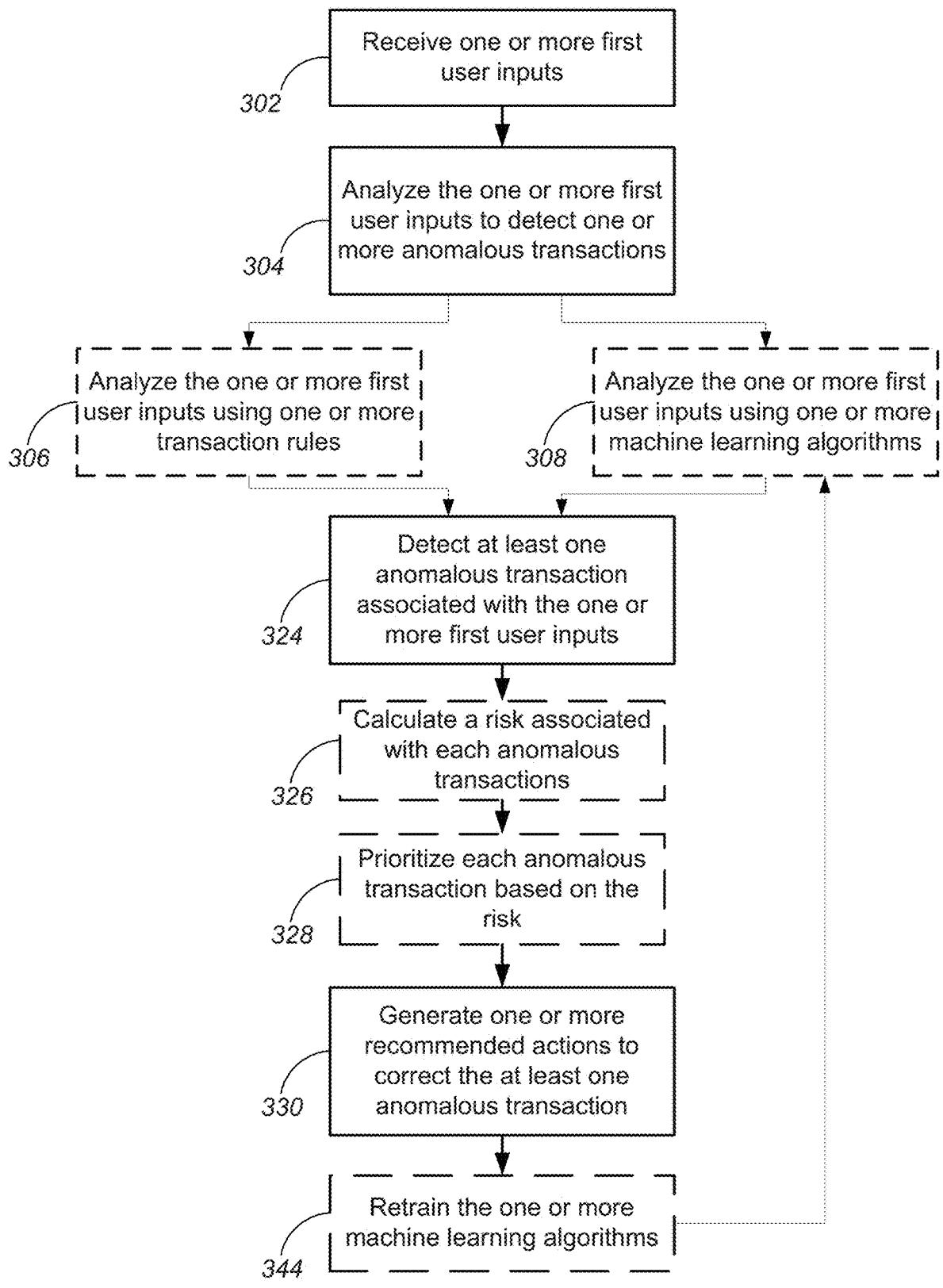
FIGS. 3A-3D are flow diagrams illustrating a method for detecting and correcting anomalous events in real-time as users enter data into a general ledger, in accordance with various embodiments.
Figure 3B:
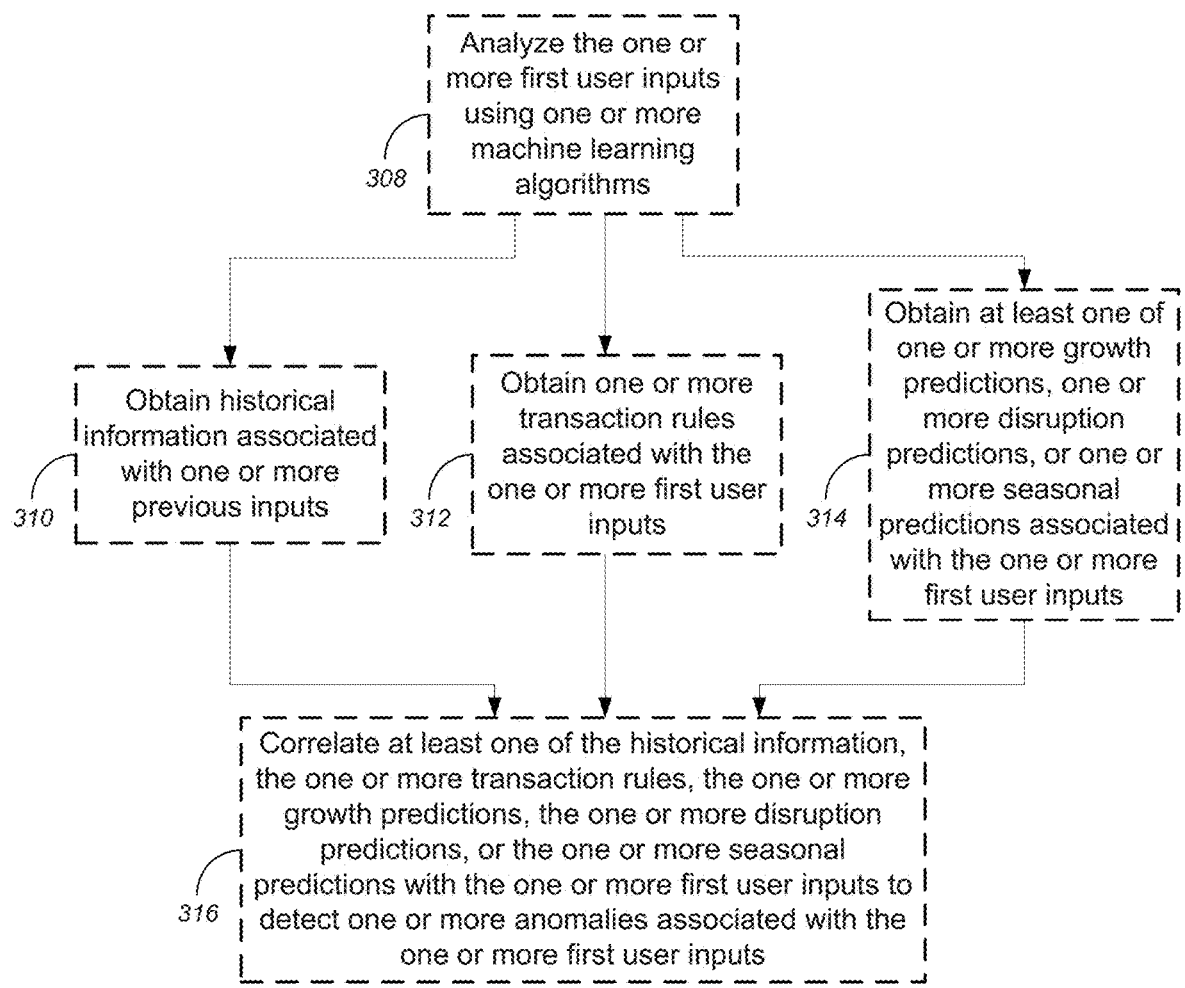
Figure 3C:
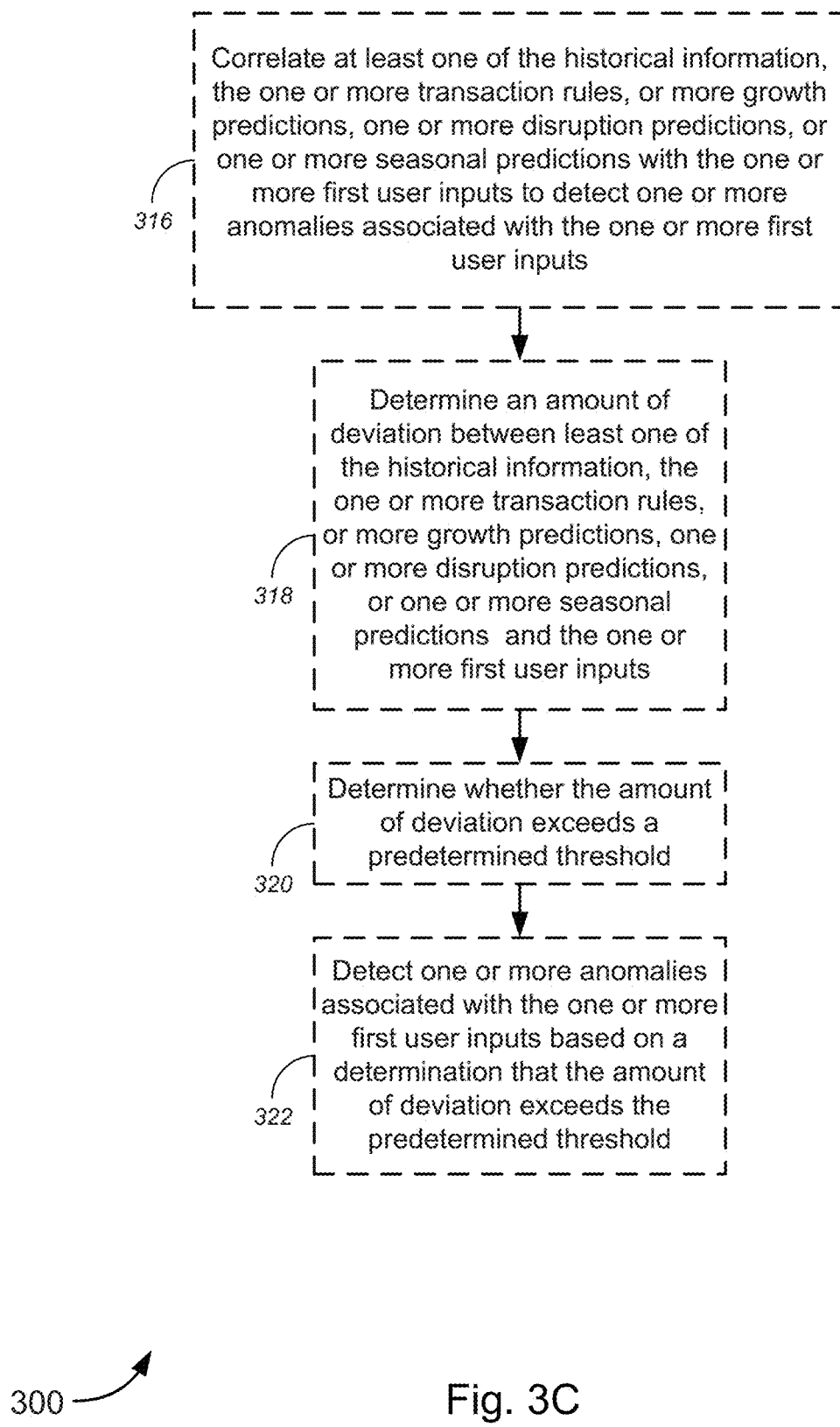

Correlating the historical information and, optionally, the one or more transactions functions, the one or more growth predictions, the one or more disruption predictions, and/or the one or more seasonal predictions with the one or more first user inputs, might include, at optional block 318 of FIG. 3C, determining, using the computing system and the one or more machine learning algorithms, an amount or a percentage of deviation between the historical information (optionally supplemented by information obtained from the one or more transactions functions, the one or more growth predictions, the one or more disruption predictions, or the one or more seasonal predictions) and the one or more first user inputs. Next at optional block 320, the method 300 might include determining, using the computing system and the one or more machine learning algorithms, whether the amount or percentage of deviation between the historical information (optionally supplemented by information obtained from the one or more transactions functions, the one or more growth predictions, the one or more disruption predictions, or the one or more seasonal predictions) and the one or more first user inputs exceeds a predetermined threshold. Based on the determination that the amount or percentage of deviation exceeds the predetermined threshold (e.g., the transaction amount entered by the user is 1.5 times higher than historical amounts/trends and/or deviates by over 30% from historical amounts/trends), the method 300, at optional block 322 might detect, using the computing system, the one or more anomalies associated with the one or more first user inputs. In some cases, the amount of deviation between the historical information (optionally supplemented by information obtained from the one or more transactions functions, the one or more growth predictions, the one or more disruption predictions, or the one or more seasonal predictions) and the one or more first user inputs might indicate an amount of risk associated with a particular user input into the general ledger. A higher deviation might indicate a higher risk associated with a particular user input into the general ledger while a lower deviation might indicate a lower risk associated with a particular user input.

In various embodiments, the method 300 might return to the method shown in FIG. 3A. At block 324, the method 300 might detect at least one anomalous transaction associated with the one or more first user inputs. The detection of the at least one anomalous transaction may be in real-time as the one or more first user inputs are entered into the general ledger. The detection of the at least one anomalous transaction associated with the one or more first user inputs may be based on the analysis of the one or more first user inputs using the one or more transactions functions, on the analysis of the one or more first user inputs using the one or more machine learning algorithms, or on a combination of the analysis of the one or more first user inputs using the one or more transactions functions and of the analysis of the one or more first user inputs using the one or more machine learning algorithms.

In some cases, at optional block 326, method 300 might include calculating, using the computing system, a risk associated with each anomalous transactions. The calculated risk may be based on the one or more transaction functions, the amount of deviation determined using the one or machine learning algorithms, and/or the like. In some instances, the method 300, at optional block 328, might include prioritizing, using the computing system, the anomalous transactions based on the risk associated with each anomalous transaction. In other words, anomalous transactions with a higher risk may be addressed first while less risky transactions may be addressed later.

Figure 3D:
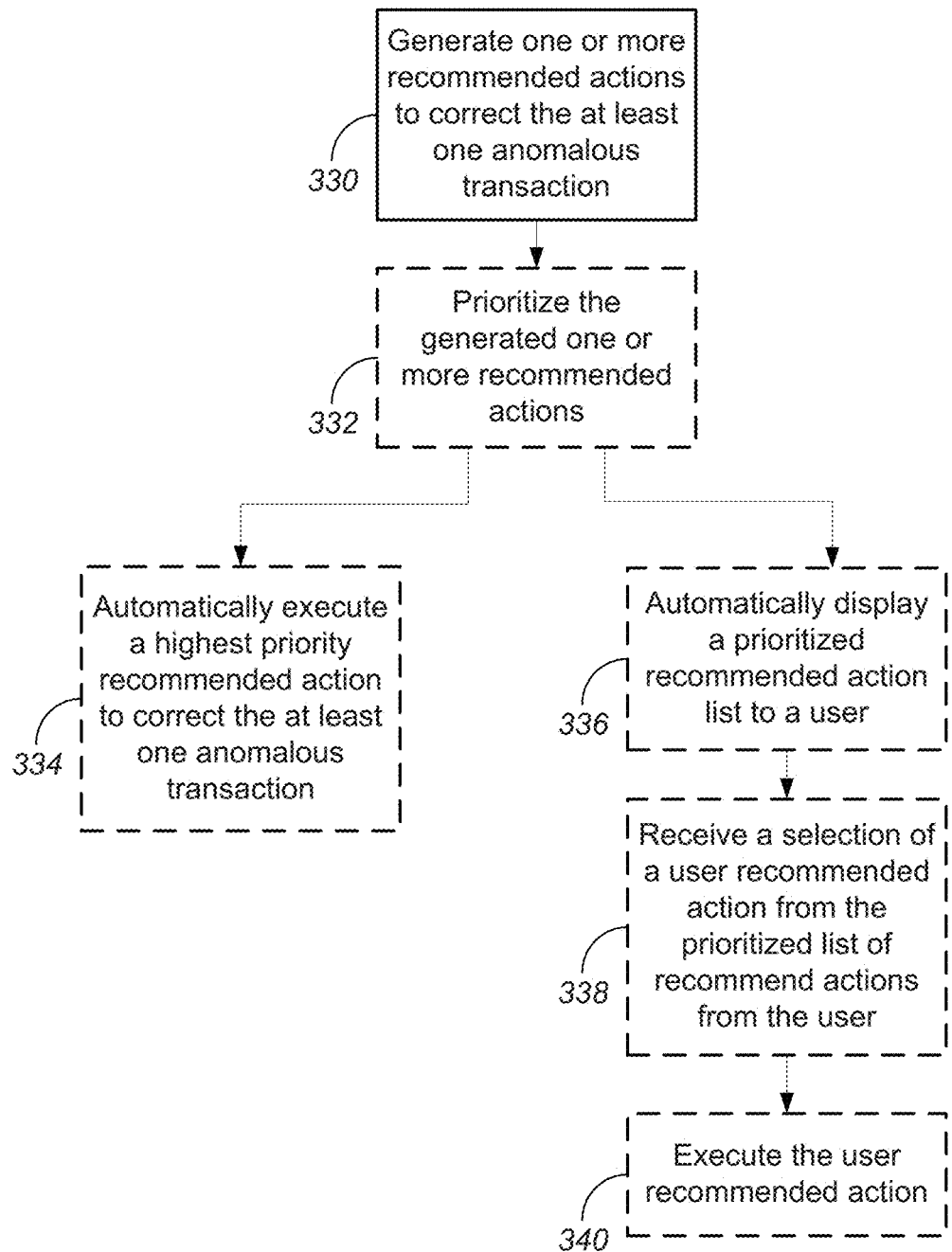

In various embodiments, the method 300, at block 330, might continue by generating, using the computing system, one or more recommended actions to correct the at least one anomalous transaction. The one or more recommended actions may be generated in real-time as the one or more first user inputs are entered into the general ledger. In some cases, as shown in FIG. 3D, at optional block 332, the method 300 might prioritize, using the computing system, the generated one or more recommended actions. The recommended actions may be prioritized based on an amount of certainty that a recommended action is a correct action. The amount of certainty of a recommended action may be based on using the one or more machine learning algorithms to detect one or more trends in the historical data (optionally supplemented by information obtained from the one or more transactions functions, the one or more growth predictions, the one or more disruption predictions, or the one or more seasonal predictions) to determine one or more historical trends associated with the one or more first user inputs and/or to determine how the one or more anomalies were corrected in the past. In a non-limiting example, if a particular transaction type is usually associated with a particular customer and a first user input associates the particular transaction with a different customer, then, based on historical trends, the computing system may calculate a degree of certainty to recommend the transaction type to be associated with the particular customer.

In various cases, at optional block 334, method 300 might continue by automatically executing, using the computing system, a highest priority recommended action to correct the at least one anomalous transaction. In some cases, the computing system might automatically execute the highest priority recommended action based on an amount of certainty that a recommended action is a correct action exceeding a predetermined threshold. In a non-limiting example, if the computing system calculates a 95% confidence score that the highest priority recommended action is correct, then the computing system might automatically execute the highest priority recommended action to correct the at least one anomalous transaction. A notification may be displayed to an end user of the computing system that the highest priority recommended action of the generated one or more recommended actions has been executed. The method 300 might automatically execute the highest priority recommended action to correct the at least one anomalous transaction in real-time as the one or more first user inputs are entered into the general ledger.

Alternatively, in other cases, at optional block 336, method 300 might continue by automatically displaying, using the computing system, a prioritized list of recommended actions to an end user of the computing system. Next, the method 300 might continue by receiving, using the computing system, a selection of a user recommended action from the prioritized list of recommended actions from the user (optional block 338) and executing, using the computing system, the user recommended action (optional block 340). The prioritized list of recommended actions may be displayed to the end user in real-time as the one or more first user inputs are received by the computing system and entered into the general ledger stored on the computing system.

In various instances, the method 300 of FIG. 3A, may continue at optional block 342 by retraining, using the computing system, the one or more machine learning algorithms. The one or more machine learning algorithms may be retrained by the one or more first user inputs (if they were not anomalous), by the one or more corrected first user inputs (if there were anomalous), by the one or more recommended actions automatically executed by the computing system, by the one or more recommended actions selected by a user, and/or the like. The one or more machine learning algorithms may be retrained at at least one of an end of a day based on daily data entered into the general ledger, an end of a week based on weekly data entered into the general ledger, an end of a month based on monthly data entered into the general ledger, an end of a quarter based on quarterly data entered into the general ledger, an end of a season based on seasonal data entered into the general ledger, or an end of a year based on yearly data entered into the general ledger.

In some instances, a risk associated with each anomalous transaction may be recalculated and used to retrain the machine learning algorithms based on the one or more actions selected by a user. The computing system may learn from the user selected recommendation and a subsequent risk score associated with one or more similar anomalies may be adjusted accordingly. Based on the recalculated risk score, similar anomalies may be re-prioritized based on the adjusted risk score and/or similar recommendations associated with one or more similar anomalies may be automatically accepted or rejected in the future without user input. In other instances, a calculation that a recommended action is the correct action to address the anomalous transaction may be recalculated and used to retrain the machine learning algorithms based on the one or more actions selected by a user. The computing system may learn from the user selection and a subsequent calculation associated with the recommended action for one or more similar anomalies may be adjusted accordingly. Based on the recalculated recommended action, similar recommendations associated with one or more similar anomalies may be automatically accepted or rejected in the future without user input.

One or more other methods for detecting anomalous and correcting anomalous events in real-time as users enter data into a general ledger, are described in greater detail below with respect to FIGS. 4-6.

Figure 4:
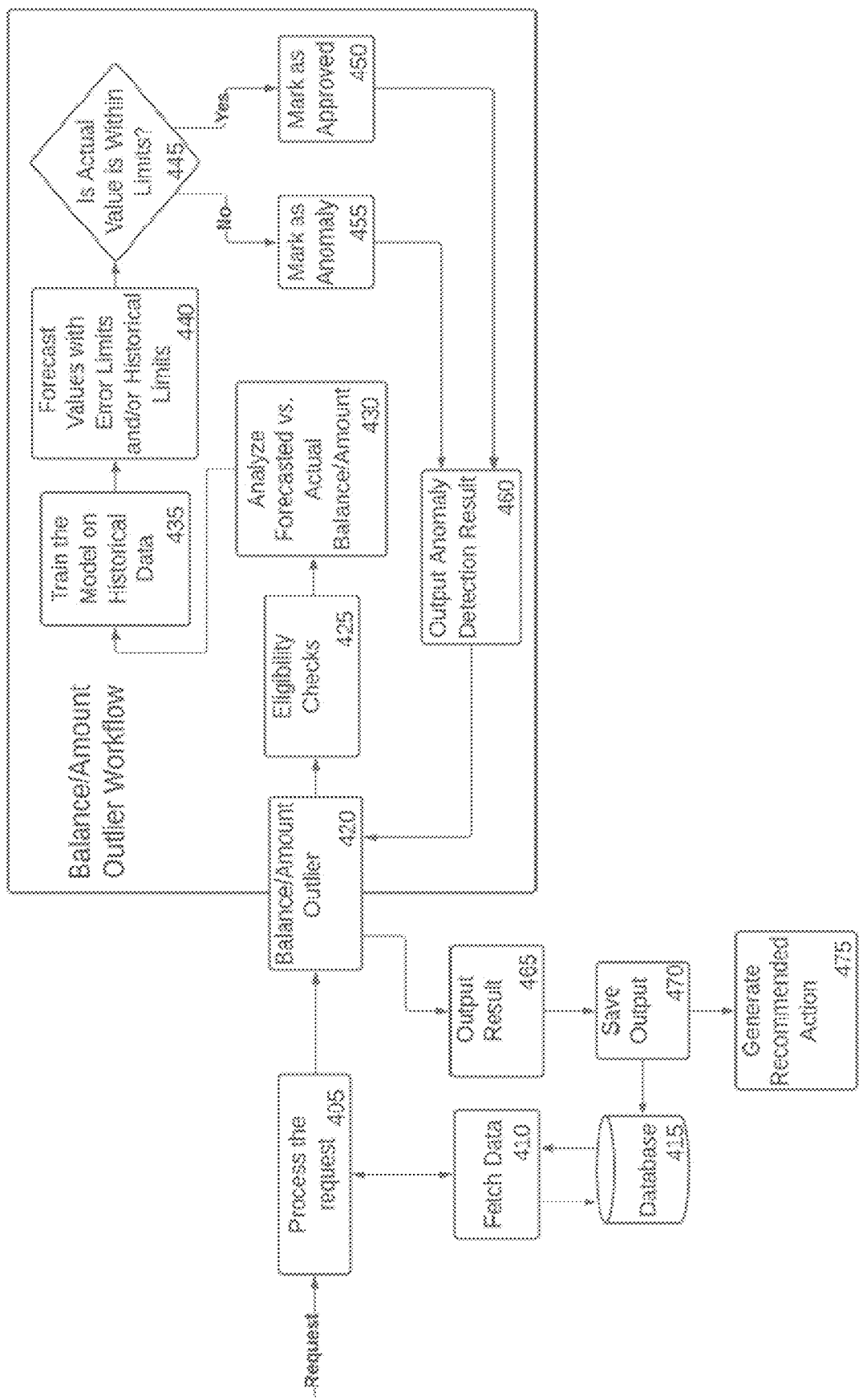
FIG. 4 is a workflow diagram illustrating a workflow or method for implementing detection and correction of anomalous balance outliers and/or anomalous amount outliers in real-time as users enter data into a general ledger, in accordance with various embodiments.

Turning to FIG. 4, FIG. 4 is a workflow diagram illustrating a workflow or method 400 for implementing detection and correction of anomalous balance outliers and/or anomalous amount outliers in real-time as users enter data into a general ledger, in accordance with various embodiments. FIG. 4 is intended to provide an illustrative perspective with respect to the detection and correction of anomalous balance outliers and/or anomalous amount outliers in real-time as users enter data into a general ledger, and is not limited to such functionalities, but may be applicable to some (if not all) of the functionalities described above with respect to FIGS. 1-3. Additionally, although the workflow diagram of FIG. 4 may be used to detect anomalous balance outliers and/or amount outliers in real-time, it is not limited to only anomalous balance outliers and/or anomalous amount outliers in real-time and could be adapted to address any of the outliers and/or anomalies described in FIGS. 1-3. The workflow diagram of FIG. 4 may be implemented by the computing system(s) 105 and/or 115 of FIG. 1 and/or the anomaly engine 205 of FIG. 2. Additionally and/or alternatively, the workflow diagram of FIG. 4 may be independent of or used in conjunction with the method of FIG. 3.

To begin the process, a computing system may implement the workflow 400 of FIG. 4, by first receiving a request and/or one or more user inputs. The request might be a request to run a method or a computer program to detect one or more anomalies within a general ledger. For example, the request might occur at at least one of an end of a day, an end of a week, an end of a month, an end of a quarter, or an end of a year, and/or the like. The one or more user inputs might be one or more entries into a general ledger stored on a computing system. For example, the one or more user inputs might be one or more entries of transactions (e.g., one or more customer transactions, one or more company transactions, one or more vendor transactions, one or more credits, one or more debits, one or more payments, one or more accruals, one or more amounts, and/or the like) into the general ledger.

The computing system might process the request and/or one or more user inputs 405. A computing system might analyze the request and/or the one or more user inputs to determine and/or extract one or more attributes associated with the request and/or one or more user inputs. The one or more attributes associated with the request and/or one or more user inputs might include, without limitation, a customer, a type of customer, a company, a type of company, a vendor, a type of vendor, a department, a type of transaction (e.g., a customer transaction, a company transaction, a vendor transaction, a credit, a debit, a payment, an accrual, and/or the like), an amount of a transaction, a date of a transaction, a source of a transaction, an account type, and/or the like.

Based on the one or more attributes associated with the request and/or one or more user inputs, the computing system might fetch data 410 associated with the request and/or one or more user inputs from one or more databases 415. The data may be associated with and/or related to the one or more attributes. In a non-limiting example, if the transaction is associated with a particular customer, the data retrieved from the one or more databases 415 might be related to the particular customer. In some cases, the data may be one or more functions associated with the request and/or one or more historical user inputs and/or historical data associated with the request and/or one or more user inputs. In order to determine whether there is a balance outlier and/or an amount outlier, the computing system might retrieve data associated with historical balances of the general ledger, historical data associated with transactions amounts, and/or the like.

Next, the computing system might analyze and/or detect whether there is an outlier associated with the request and/or one or more user inputs 420. In the case of FIG. 4, the computing system might detect whether there is a balance outlier or an amount outlier associated with the request and/or one or more user inputs 420.

In order to detect whether there is an outlier associated with the request and/or one or more user inputs, the computing system might perform one or more eligibility checks on the data received from the databases 415. The eligibility checks might be used to determine whether there is sufficient data stored in the databases 415 to detect whether there is a balance outlier or an amount outlier associated with the request and/or one or more user inputs. In a non-limiting example, the computing system may need at least one day of data, one week of data, one month of data, one year of data, and/or the like to detect whether there is a balance outlier or an amount outlier associated with the request and/or one or more user inputs.

Based on a determination that there is sufficient data stored in the databases 415 to detect whether there is a balance outlier or an amount outlier associated with the request and/or one or more user inputs, the computing system at 430 might next analyze the request and/or one or more user inputs and the data retrieved from databases 415. In order to analyze the request and/or one or more user inputs and the data, the computing system might analyze a forecasted account balance and/or transaction amount using the data stored in databases 415 against an actual balance amount and/or transaction amount created by the request and/or one or more user inputs 430.

In order to detect a balance outlier, the computing system might forecast a day end balance, a month end balance, and/or the like using historical data stored in databases 415 and compare it with the actual balance caused by the request and/or one or more user inputs. In order to detect a balance outlier, the computing system might first train one or more machine learning algorithms based on the historical data 435. The training of the one or more machine learning algorithms may be performed as the one or more user inputs are entered into the computing system. Alternatively, the training of the one or more machine learning algorithms may be performed in advance before the one or more user inputs are entered into the computing system. The machine learning model may learn historical trends associated with the balance to detect one or more balance outliers associated with the request and/or the one or more user inputs. The model may also be tuned to consider one or more of the following parameters based on the historical data:

a. Seasonality (e.g., quarterly, monthly, weekly, season, etc.): This refers to the periodic repeated pattern in historical balance data for a general ledger account. It can be a monthly pattern, a weekly pattern, a seasonal pattern, etc. where the balance data may be repeated;

b. Growth (e.g., linear growth, exponential growth, etc.): This refers to the overall growth/trend of balance for a general ledger account from the very beginning to the most recent data (which can include data contained within the request or the one or more user inputs or data entered immediately before the request or the one or more user inputs);

c. Changepoints/Disruption: This refers to the number of times the pattern of historical balance data was disrupted (e.g., a number of outliers in the historical data); and/or d. Day of Week or Month (e.g., weekend, week day, particular date, etc.): This refers to trends (e.g., more sales during a week day, payments typically scheduled for $1^{st}$ day of a month, etc.) associated with particular days of a week, a month, or a year etc.; and/or the like.

Each parameter may be given a different weight based on at least one of type of business, influence on general ledger balance, and/or the like. For example, a company that does more business during the summer may cause the machine learning algorithm to give more weight to seasonality versus a company that does consistent business all year which may cause the machine learning algorithm to give less or no weight to seasonality.

Once the machine learning algorithms are trained based on the historical data and/or tuned based on one or more parameters, the computing system may use the machine learning algorithms to correlate the historical data and/or one or more parameters with the request and/or one or more user inputs to detect one or more anomalies. Based on the correlation between the historical data and/or one or more parameters and the request and/or one or more user inputs, the computing system might predict a balance and/or a range of the balance of the general ledger 440 and determine whether the request and/or one or more user inputs causes the actual balance of the general ledger to match the predicted balance and/or fall within the range of the predicted balance 445.

Based on determination that the actual balance of the general ledger matches or falls within the range of the predicted balance, then the request and/or the one or more user inputs may be approved and not marked as an anomaly 450. Based on determination that the actual balance of the general ledger does not match or falls outside of the range of the predicted balance, then the request and/or the one or more user inputs may be marked as an anomaly 455. In some cases, the computing system might calculate a percentage of deviation from the predicted balance and/or the range of the predicted balance. If the percentage of deviation exceeds a predetermined threshold, then the request and/or the one or more user inputs may be marked as an anomaly. Alternatively, if the percentage of deviation is within a predetermined threshold, then the request and/or the one or more user inputs may not be marked as an anomaly.

In order to detect an amount outlier (e.g., unusually high or low transactions), the computing system might collect historical transactions associated with, without limitation, a particular customer or customer type (e.g., a first time customer, a frequent customer, a female customer, a male customer, a young customer, etc.), a particular vendor or vendor type (e.g., a first time vendor, a frequent vendor, a raw goods vendor, a consultant, etc.), a particular company or company type (e.g., a manufacturer, an engineering company, etc., a particular general ledger account (e.g., a software expense account, a prepaid asset account, a department account, etc.), a particular transaction type (e.g., a debit, a credit, etc.), and/or the like using the historical data stored in databases 415 and compare it with the current transaction caused by the request and/or one or more user inputs. In order to detect an amount outlier, the computing system might first train one or more machine learning algorithms based on the historical data 435. The training of the one or more machine learning algorithms may be performed as the one or more user inputs are entered into the computing system. Alternatively, the training of the one or more machine learning algorithms may be performed in advance before the one or more user inputs are entered into the computing system. The machine learning model may learn historical trends associated with the transaction amounts to detect one or more amount outliers associated with the request and/or the one or more user inputs.

Once the machine learning algorithms are trained based on the historical data, the computing system may use the machine learning algorithms to correlate the historical data and/or one or more parameters with the request and/or one or more user inputs to detect one or more anomalies associated with the one or more transaction amounts. Based on the correlation between the historical data and/or one or more parameters and the request and/or one or more user inputs, the computing system might predict an average transaction amount and/or a range of the average transaction amount 440 and determine whether the request and/or one or more user inputs causes the actual amount of the general ledger to match the predicted amount and/or fall within the range of the predicted amount 445.

Based on determination that the actual amount of the transaction in the general ledger matches or falls within the range of the predicted amount, then the request and/or the one or more user inputs may be approved and not marked as an anomaly 450. Based on determination that the actual amount in the general ledger does not match or falls outside of the range of the predicted amount, then the request and/or the one or more user inputs may be marked as an anomaly 455. In some cases, the computing system might calculate a percentage of deviation from the predicted amount and/or the range of the predicted amount. If the percentage of deviation exceeds a predetermined threshold, then the request and/or the one or more user inputs may be marked as an anomaly. Alternatively, if the percentage of deviation is within a predetermined threshold, then the request and/or the one or more user inputs may not be marked as an anomaly.

Once the request and/or the one or more user inputs are marked as anomaly (e.g., a balance outlier and/or an amount outlier) or approved, then the computing system might output an anomaly detection result 460 and 465. The anomaly detection result might be saved in the one or more databases 470 and used to later retrain the one or more machine learning algorithms. If the request and/or the one or more user inputs is marked as an anomaly, the computing system might further generate one or more recommended actions to correct the anomaly 475.

In a non-limiting example, a machine learning algorithm might detect that an amount that has been booked to the Software Expense account is far higher than any previous transaction coded to the account. By analyzing the past transaction history, using the machine learning algorithms, the computing system might flag the transaction as an anomaly and that the invoice has been wrongly coded. The computing system might further determine that the amount should be coded to the Prepaid Asset Account. The computing system may then generate one or more recommended actions (e.g., recommended that the amount should be coded to the Prepaid Asset Account) and makes the recommended actions available to a user to implement. Alternatively, the computing system might determine that the invoice has been wrongly coded to a threshold degree of certainty, then the computing system may automatically code the invoice to the Prepaid Asset Account and notify the user that the invoice has been automatically corrected.

Exemplary System and Hardware Implementation

Figure 5:
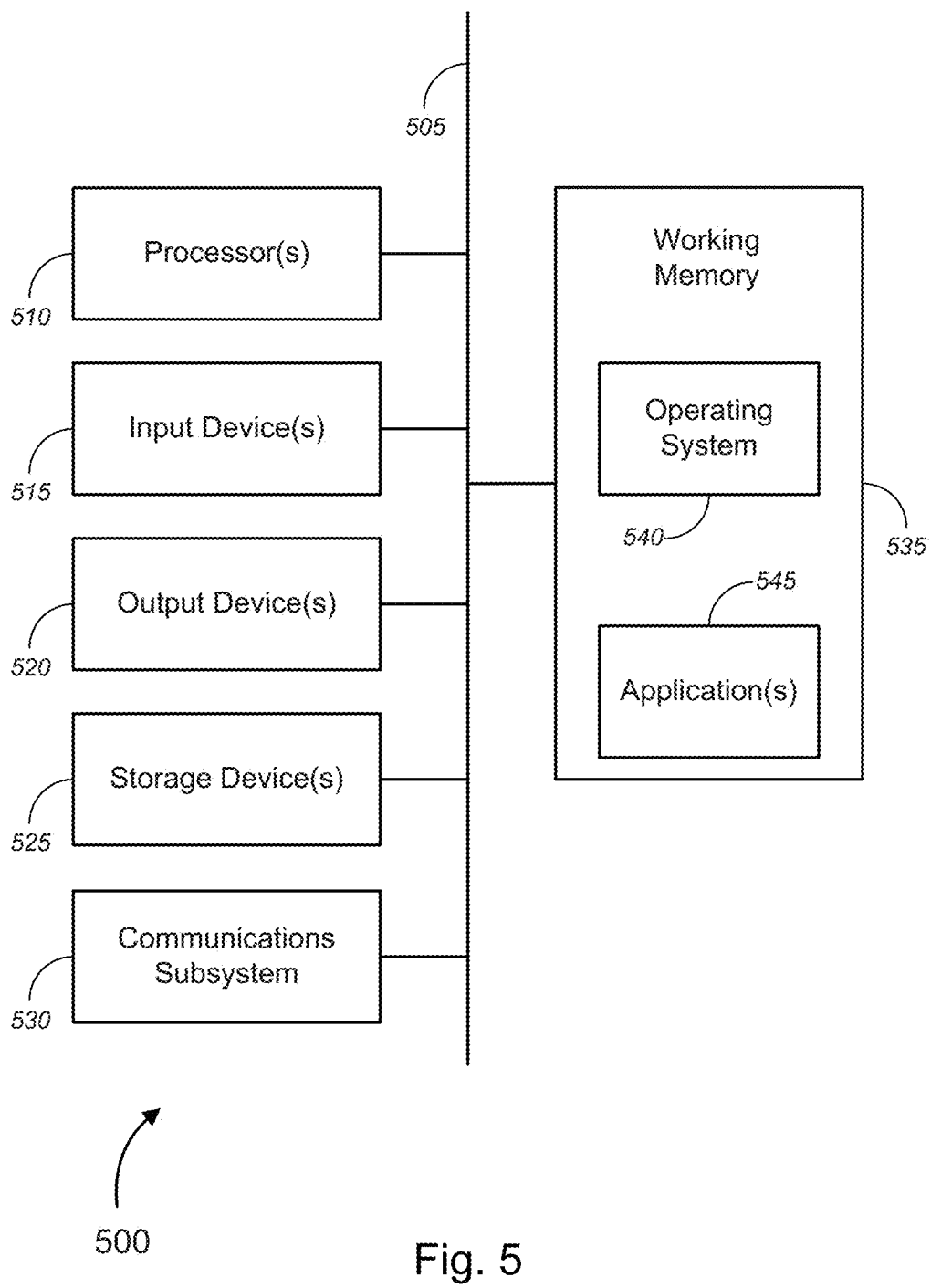
FIG. 5 is a block diagram illustrating an exemplary computer or system hardware architecture, in accordance with various embodiments.
Figure 6:
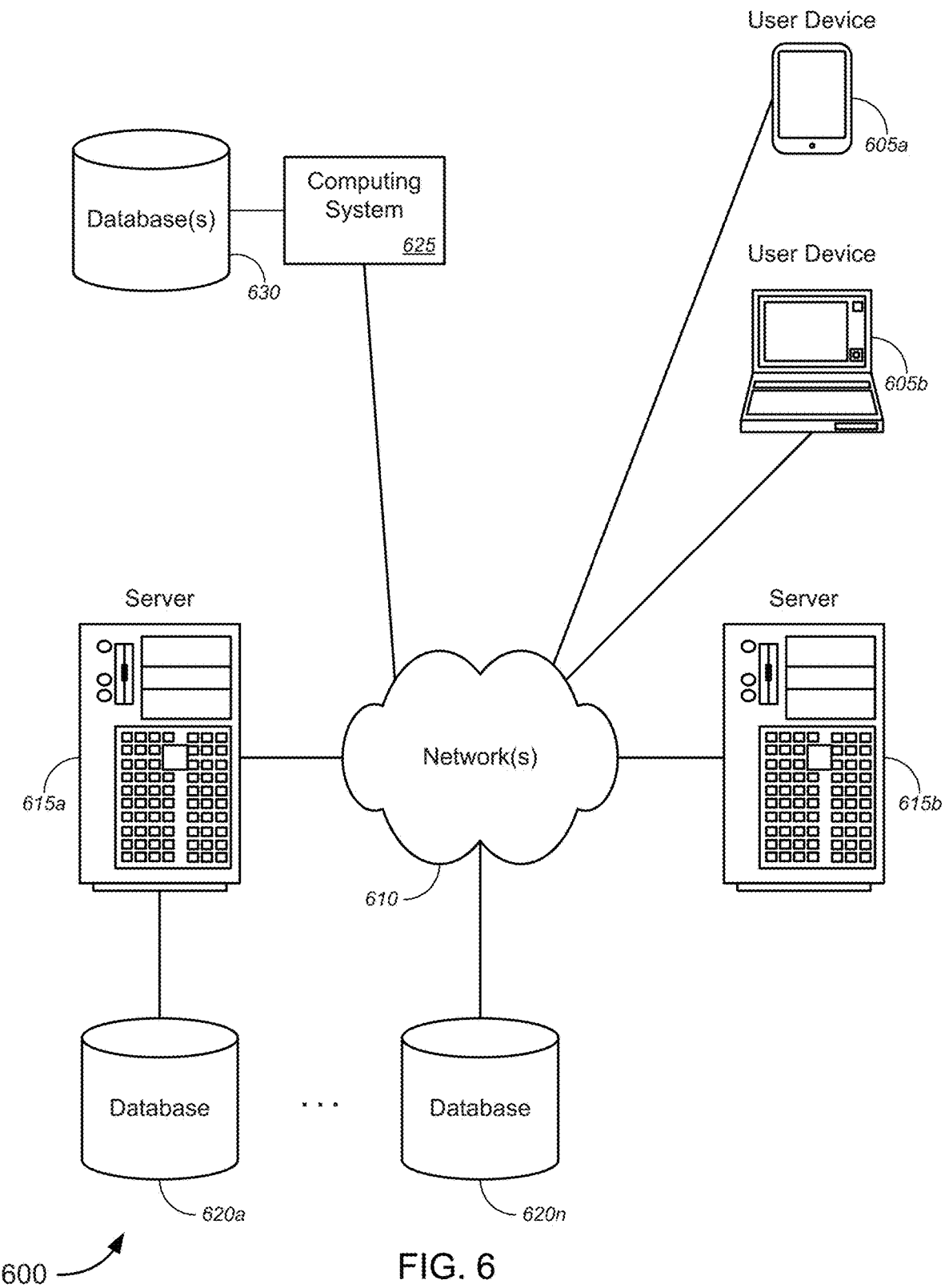
FIG. 6 is a block diagram illustrating a networked system of computers, computing systems, or system hardware architecture, which can be used in accordance with various embodiments.

FIG. 5 is a block diagram illustrating an exemplary computer or system hardware architecture, in accordance with various embodiments. FIG. 5 provides a schematic illustration of one embodiment of a computer system 500 of system hardware that can perform the methods provided by various other embodiments, as described herein, and/or can perform the functions of computer or hardware system (e.g., first computing system(s) 105, second computing system(s) 115, anomaly engine 205, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (e.g., first computing system(s) 105, second computing system(s) 115, anomaly engine 205, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

As noted above, a set of embodiments comprises methods and systems for detecting and correcting anomalous events in real-time in finance and accounting and, more particularly, methods, systems, and apparatuses for detecting and correcting anomalous events in real-time as users enter data into a general ledger. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 120 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for detecting and correcting anomalous events in real-time in finance and accounting and, more particularly, for detecting and correcting anomalous events in real-time as users enter data into a general ledger, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to first computing system 105 of FIG. 1, or the like) and corresponding database(s) 630 (similar to database(s) 110 of FIG. 1, or the like).

In operation, one or more computing systems 625 may receive one or more first user inputs into a general ledger stored on the one or more computing systems 625 and/or databases 620 or 630. The one or more computing systems 625 might analyze the one or more first user inputs to detect one or more anomalous transactions associated with the one or more first user inputs. In order to analyze the one or more first user inputs to detect one or more anomalous transactions associated with the one or more first user inputs, the one or more computing systems might obtain historical information stored in the one or more computing systems 625 and/or databases 620 or 630 and associated with one or more previous inputs and correlate, using one or more machine learning algorithms, the historical information and the one or more first user inputs to detect one or more anomalies associated with the one or more first user inputs. Next, based on the correlation between the historical information and the one or more first user inputs, the one or more computing systems 625 might detect at least one anomalous transaction associated with the one or more first user inputs. Additionally, the one or more computing systems 625 might generate one or more recommended actions to correct the at least one anomalous transaction.

These and other functions of the system 600 (and its components) are described in greater detail above with respect to FIGS. 1-5.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, using a computing system, one or more first user inputs into a general ledger stored on the computing system;
   analyzing, using the computing system, the one or more first user inputs to detect one or more anomalous transactions associated with the one or more first user inputs, wherein analyzing the one or more first user inputs comprises:
      obtaining, using the computing system, historical information associated with one or more previous inputs; and
      correlating, using the computing system and one or more machine learning algorithms, the historical information and the one or more first user inputs to detect one or more anomalies associated with the one or more first user inputs;
   based on the correlation between the historical information and the one or more first user inputs, detecting, using the computing system, at least one anomalous transaction associated with the one or more first user inputs;
   generating, using the computing system, one or more first recommended actions to correct the at least one anomalous transaction;
   retraining, using the computer system, the one or more machine learning algorithms based on a subsequent risk score associated with one or more anomalies and one or more corrected user inputs associated with the one or more anomalies;
   generating, using the computing system, one or more second recommended actions comprising at least one second recommended action different from the one or more first recommended actions to correct the at least one anomalous transaction using the one or more machine learning algorithms that were retrained;
   based on the one or more second recommended actions to correct the at least one anomalous transaction, automatically prioritizing, using the computing system, the one or more second recommended actions; and
   based on the prioritized one or more second recommended actions, automatically executing, using the computing system, a prioritized second recommended action having a highest priority to correct the at least one anomalous transaction.

2. The method of claim 1, wherein analyzing the one or more first user inputs to detect the one or more anomalous transactions associated with the one or more first user inputs, detecting the at least one anomalous transaction associated with the one or more first user inputs, and generating one or more first recommended actions to correct the at least one anomalous transaction occurs in real-time as the one or more first user inputs are received by the computing system and entered into the general ledger stored on the computing system.

3. The method of claim 1, wherein analyzing the one or more first user inputs to detect one or more anomalous transactions associated with the one or more first user inputs, detecting the at least one anomalous transaction associated with the one or more first user inputs, and generating one or more first recommended actions to correct the at least one anomalous transaction occurs automatically at at least one of an end of a day, an end of a week, an end of a month, an end of a quarter, or an end of a year.

4. The method of claim 1, wherein the historical information comprises at least one of customer information, company information, or vendor information, and wherein at least one of the customer information, the company information, or the vendor information is associated with at least one of one or more previous user inputs into the general ledger, one or more third party inputs, or one or more customer inputs, one or more company inputs, or one or more vendor inputs.

5. The method of claim 1, wherein the historical information comprises at least one of historical daily data, historical weekly data, historical monthly data, historical quarterly data, historical seasonal data, or historical yearly data.

6. The method of claim 1, wherein the historical information comprises at least one of historical accounts receivable data, historical accounts payable data, or historical general ledger data.

7. The method of claim 1, wherein the at least one anomalous transaction is at least one of a transaction amount outlier, a transaction type outlier, a missing transaction outlier, a transaction time outlier, a vendor transaction outlier, a customer transaction outlier, a department transaction outlier, a prepaid expense transaction outlier, an accrual transaction outlier, or a general ledger balance outlier.

8. The method of claim 1, wherein analyzing the one or more first user inputs to detect the one or more anomalous transactions associated with the one or more first user inputs further comprises:
   obtaining, using the computing system, one or more transaction functions associated with the one or more first user inputs; and
   correlating, using the computing system and the one or more machine learning algorithms, the historical information, the one or more transaction functions, and the one or more first user inputs to detect the one or more anomalies associated with the one or more first user inputs.

9. The method of claim 8, wherein the one or more transaction functions are one or more customizable functions that a user of the computing system can add, edit, or delete.

10. The method of claim 1, wherein analyzing the one or more first user inputs to detect the one or more anomalous transactions associated with the one or more first user inputs further comprises:
    obtaining, using the computing system, at least one of one or more growth predictions, one or more disruption predictions, or one or more seasonal predictions associated with the one or more first user inputs; and
    correlating, using the computing system and the one or more machine learning algorithms, the historical information, the one or more first user inputs, and at least one of the one or more growth predictions, the one or more disruption predictions, or the one or more seasonal predictions associated with the one or more first user inputs to detect the one or more anomalies associated with the one or more first user inputs.

11. The method of claim 1, wherein correlating, using the one or more machine learning algorithms, the historical information and the one or more first user inputs to detect the one or more anomalies associated with the one or more first user inputs further comprises:

determining, using the computing system and the one or more machine learning algorithms, an amount of deviation between the historical information and the one or more first user inputs;

determining, using the computing system and the one or more machine learning algorithms, whether the amount of deviation between the historical information and the one or more first user inputs exceeds a predetermined threshold; and based on a determination that the amount of deviation between the historical information and the one or more first user inputs exceeds the predetermined threshold, detecting, using the computing system, the one or more anomalies associated with the one or more first user inputs.

12. The method of claim 1, wherein a notification is displayed to an end user of the computing system that the highest priority recommended action of the two or more second recommended actions has been executed.

13. The method of claim 1, further comprising:
based on the one or more first recommended actions to correct the at least one anomalous transaction, automatically displaying, using the computing system, a prioritized list of recommended actions to an end user of the computing system;
receiving, using the computing system, a selection of a user recommended action from the prioritized list of recommend actions from the end user; and
executing, using the computing system, the user recommended action.

14. The method of claim 13, wherein the prioritized list of recommended actions is displayed to the end user in real-time as the one or more first user inputs are received by the computing system and entered into the general ledger stored on the computing system.

15. The method of claim 13, wherein the one or more machine learning algorithms are retrained based on the user recommended action.

16. The method of claim 10, further comprising:
retraining, using the computing system, the one or more machine learning algorithms at least one of an end of a day based on daily data entered into the general ledger, an end of a week based on weekly data entered into the general ledger, an end of a month based on monthly data entered into the general ledger, an end of a quarter based on quarterly data entered into the general ledger, an end of a season based on seasonal data entered into the general ledger, or an end of a year based on yearly data entered into the general ledger.

17. The method of claim 1, further comprising:
based on the correlation between the historical information and the one or more first user inputs, detecting, using the computing system, at least two anomalous transactions associated with the one or more first user inputs;
calculating, using the computing system, a risk associated with each of the at least two anomalous transactions;
prioritizing, using the computing system, the at least two of the anomalous transactions based on the risk associated with each of the at least two anomalous transactions; and
at least one of automatically executing, using the computing system, the prioritized second recommended action to correct a highest prioritized anomalous transaction.

18. A computing system comprising:
at least one processor; and
a non-transitory computer readable medium communicatively coupled to the at least one processor, the non-transitory computer readable medium having stored thereon computer software comprising a set of instructions that, when executed by the at least one processor, causes the computing system to:
receive one or more first user inputs into a general ledger stored on the computing system;
analyze the one or more first user inputs to detect one or more anomalous transactions associated with the one or more first user inputs, wherein analyzing the one or more first user inputs comprises:
obtaining historical information associated with one or more previous inputs; and
correlating, using one or more machine learning algorithms, the historical information and the one or more first user inputs to detect one or more anomalies associated with the one or more first user inputs;
based on the correlation between the historical information and the one or more first user inputs, detect at least one anomalous transaction associated with the one or more first user inputs;
generate one or more first recommended actions to correct the at least one anomalous transaction;
retrain the one or more machine learning algorithms based on a subsequent risk score associated with one or more anomalies and one or more corrected user inputs associated with the one or more anomalies;
generate one or more second recommended actions comprising at least one second recommended action different from the one or more first recommended actions to correct the at least one anomalous transaction using the one or more machine learning algorithms that were retrained;
based on the one or more second recommended actions to correct the at least one anomalous transaction, automatically prioritize the one or more second recommended actions; and
based on the prioritized one or more second recommended actions, automatically execute a prioritized second recommended action having a highest priority to correct the at least one anomalous transaction.

19. A non-transitory computer readable medium having stored thereon computer software comprising a first set of instructions that, when executed by a processor, causes a computing system to:
receive one or more first user inputs into a general ledger stored on the computing system;
analyze the one or more first user inputs to detect one or more anomalous transactions associated with the one or more first user inputs, wherein analyzing the one or more first user inputs comprises:
obtaining historical information associated with one or more previous inputs; and
correlating, using one or more machine learning algorithms, the historical information and the one or more first user inputs to detect one or more anomalies associated with the one or more first user inputs;
based on the correlation between the historical information and the one or more first user inputs, detect at least one anomalous transaction associated with the one or more first user inputs;
generate one or more first recommended actions to correct the at least one anomalous transaction;
retrain the one or more machine learning algorithms based on a subsequent risk score associated with one or more anomalies and one or more corrected user inputs associated with the one or more anomalies;

generate two or more second recommended actions comprising at least one second recommended action different from the one or more first recommended actions to correct the at least one anomalous transaction using the one or more machine learning algorithms that were retrained;

based on the two or more second recommended actions to correct the at least one anomalous transaction, automatically prioritize the two or more second recommended actions; and based on the prioritized two or more second recommended actions, automatically execute a prioritized second recommended action having a highest priority to correct the at least one anomalous transaction.

* * * * *